*US010969367B2*

(12) United States Patent
Fetzer et al.

(10) Patent No.: US 10,969,367 B2
(45) Date of Patent: Apr. 6, 2021

(54) AUTOMATED ULTRASONIC INSPECTION OF ELONGATED COMPOSITE MEMBERS USING SINGLE-PASS ROBOTIC SYSTEM

(71) Applicant: The Boeing Company, Chicago, IL (US)

(72) Inventors: Barry A. Fetzer, Renton, WA (US); Justin D. Serrill, Issaquah, WA (US); Kareem Gamal Shehab, Seattle, WA (US)

(73) Assignee: The Boeing Company, Chicago, IL (US)

( * ) Notice: Subject to any disclaimer, the term of this patent is extended or adjusted under 35 U.S.C. 154(b) by 84 days.

(21) Appl. No.: 16/437,239

(22) Filed: Jun. 11, 2019

(65) Prior Publication Data
US 2020/0393418 A1   Dec. 17, 2020

(51) Int. Cl.
*G01N 29/265* (2006.01)
*G01N 29/04* (2006.01)

(52) U.S. Cl.
CPC .......... *G01N 29/265* (2013.01); *G01N 29/04* (2013.01); *G01N 2291/105* (2013.01)

(58) Field of Classification Search
CPC ...... G01N 29/04; G01N 29/22; G01N 29/265; G01N 29/043; G01N 29/225; G01N 2291/105
See application file for complete search history.

(56) References Cited

U.S. PATENT DOCUMENTS

| 4,043,185 A | * | 8/1977 | Siebert | G01N 29/223 73/619 |
| 4,848,159 A | | 7/1989 | Kennedy et al. | |
| 5,031,458 A | * | 7/1991 | Young | G01N 29/265 73/636 |
| 5,585,564 A | | 12/1996 | Brunty et al. | |
| 6,220,099 B1 | * | 4/2001 | Marti | G01N 29/069 73/633 |
| 6,658,939 B2 | | 12/2003 | Georgeson et al. | |
| 7,263,889 B2 | | 9/2007 | Kennedy et al. | |

(Continued)

FOREIGN PATENT DOCUMENTS

CN          203365077 U          12/2013

OTHER PUBLICATIONS

Extended European Search Report dated Aug. 14, 2020 in European Application No. 20161765.1.

(Continued)

*Primary Examiner* — Helen C Kwok
(74) *Attorney, Agent, or Firm* — Ostrager Chong Flaherty & Broitman P.C.

(57) ABSTRACT

Apparatus and methods for ultrasonic inspection of elongated composite members in a single scan pass using pulse echo phased arrays operating in a bubbler method. The system concept is fully automated by integrating an inspection NDI probe assembly to a robot and using the robot to move the inspection NDI probe assembly along the part (i.e., outside of an inspection tank); and by integrating tooling fixtures that move out of the way as the inspection NDI probe assembly travels along the length of the part during the inspection. In addition, the system allows for generally elongated composite members having lengthwise variation in shape, curvature and dimensions.

20 Claims, 22 Drawing Sheets

(56) References Cited

U.S. PATENT DOCUMENTS

| | | | |
|---|---|---|---|
| 7,337,673 | B2 | 3/2008 | Kennedy et al. |
| 7,617,732 | B2 | 11/2009 | Bui et al. |
| 7,644,618 | B2 | 1/2010 | Fetzer et al. |
| 7,690,259 | B2 | 4/2010 | Bui et al. |
| 7,836,768 | B2 | 11/2010 | Young et al. |
| 8,082,793 | B2 | 12/2011 | Sarr et al. |
| 9,201,047 | B1 * | 12/2015 | Walton ................. G01N 29/225 |
| 9,933,396 | B2 | 4/2018 | Fetzer et al. |
| 2002/0017140 | A1 | 2/2002 | Georgeson et al. |
| 2008/0302188 | A1 | 12/2008 | Yabushita et al. |
| 2015/0053015 | A1 | 2/2015 | Sarr et al. |
| 2016/0334301 | A1 | 11/2016 | Hafenrichter et al. |

OTHER PUBLICATIONS

Partial European Search Report dated Nov. 18, 2016 in European Application No. 16184153.1 (European counterpart of the parent application of instant divisional application).

Extended European Search Report dated Feb. 6, 2017 in European Application No. 16184153.1 (European counterpart of the parent application of instant divisional application).

Communication from the European Patent Office dated Oct. 13, 2017 in European Application No. 16184153.1 (European counterpart of the parent application of instant divisional application).

* cited by examiner

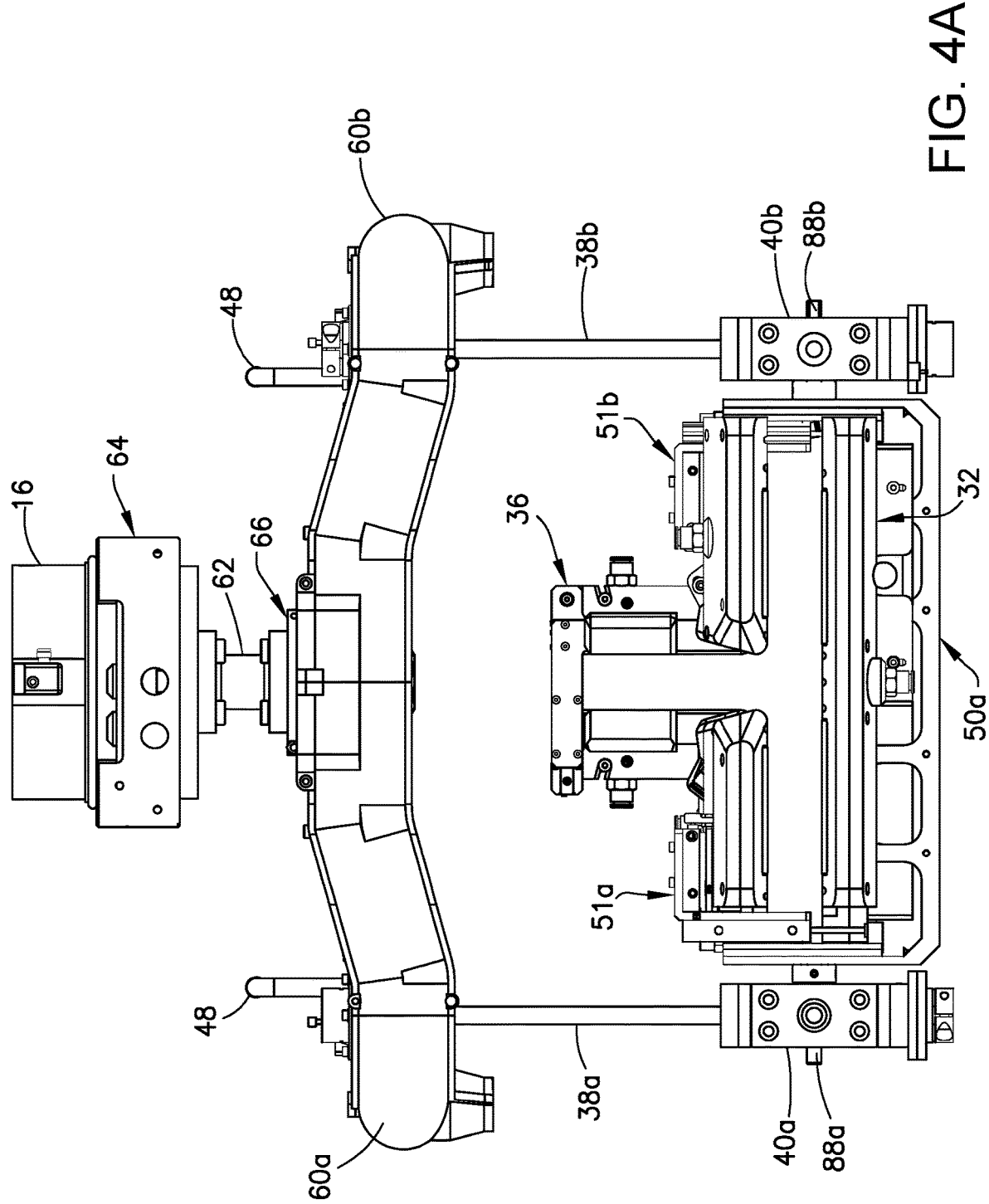

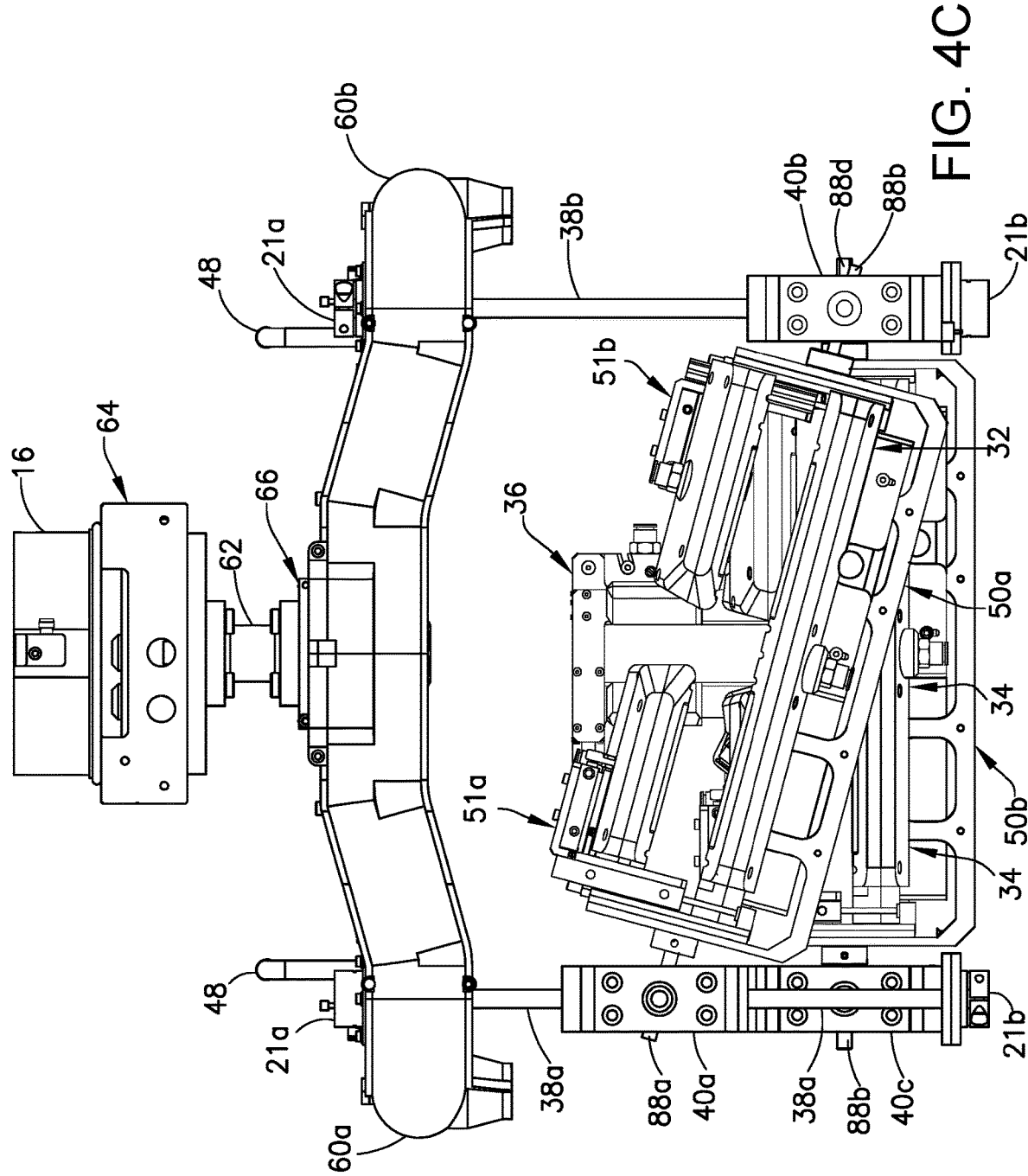

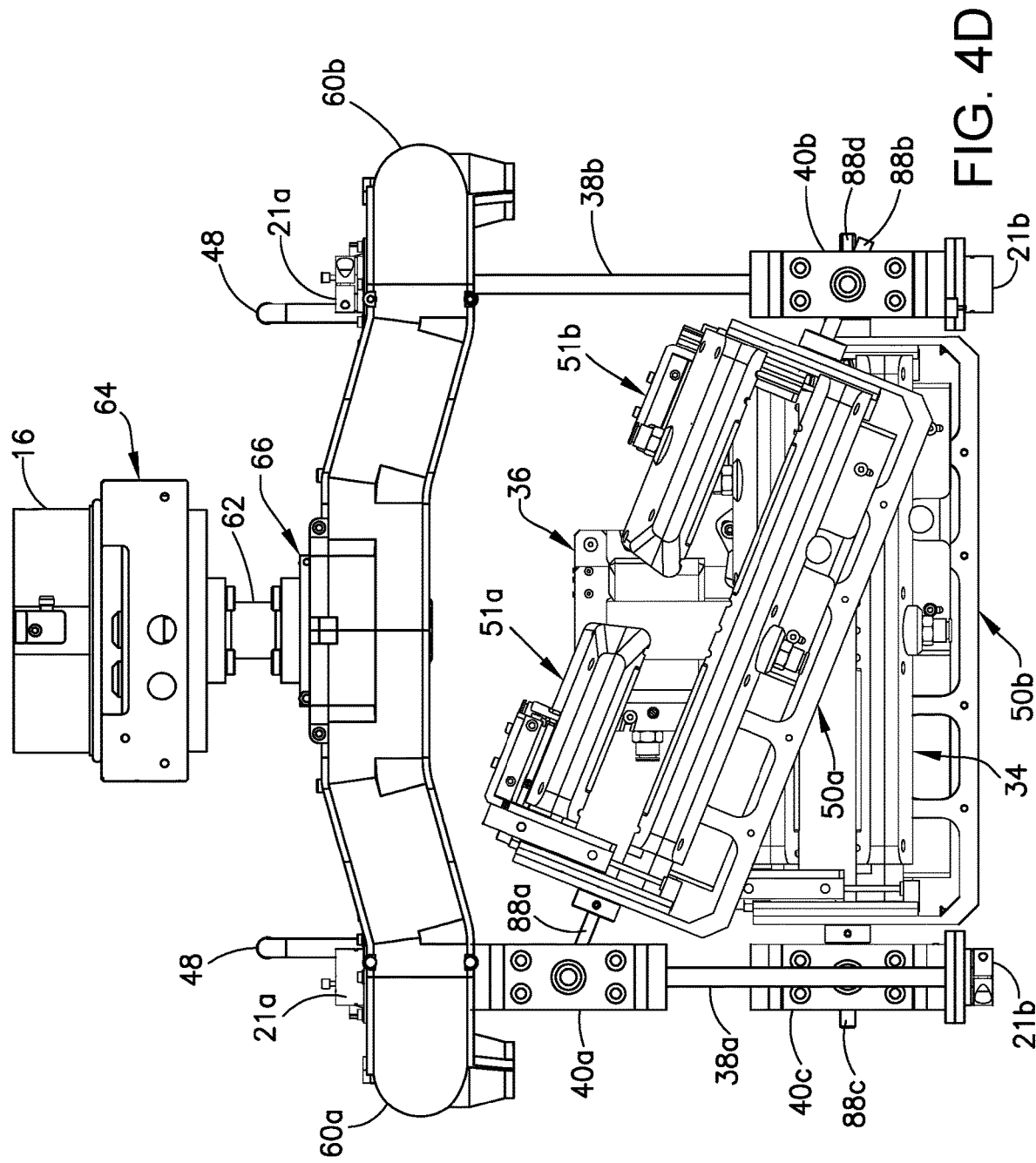

AUTOMATED ULTRASONIC INSPECTION OF ELONGATED COMPOSITE MEMBERS USING SINGLE-PASS ROBOTIC SYSTEM

BACKGROUND

This disclosure generally relates to non-destructive inspection equipment and methods, and relates more particularly to methods and apparatus for inspecting elongated members, such as stiffeners, made of composite material.

Non-destructive inspection of structures involves thoroughly examining a structure without harming the structure or requiring its significant disassembly. Non-destructive inspection is commonly used in the aircraft industry to inspect aircraft structures for any type of anomaly in the structure. Non-destructive inspection is also used in the initial fabrication of the aircraft's structural components. It is used to assure that a part was fabricated correctly and to ensure that no foreign material was embedded within the part. Inspection may be performed during manufacturing of a structure and/or after a structure has been put in service Non-destructive inspection (NDI) may be performed on stiffened composite parts of an aircraft. Composite parts such as fuselages and wings are frequently stiffened using elongated composite members called "stiffeners" or "stringers" (hereinafter "stiffeners"). These stiffeners may be made of a composite material such as carbon fiber-reinforced plastic (CFRP). As used herein, the term "elongated composite members" includes but is not limited to composite stiffeners used in the construction of fuselages and wings of aircraft, such as wing blade stiffeners and wing vent stiffeners.

More specifically, the quality of a stiffener can be determined non-destructively by ultrasonic testing. A stiffener can be inspected ultrasonically by a probe, including one or more shoes that hold respective ultrasonic transducer arrays, that is moved incrementally along the length of the stiffener. As the probe is being moved, the transducer arrays may operate in pulse/echo mode to generate pulsed ultrasonic waves, which propagate into the stiffener. Reflected ultrasonic waves are returned to and detected by the ultrasonic transducer arrays to provide data indicative of the presence of anomalies in the stiffener. Data acquired by the ultrasonic transducer arrays is typically processed by a computer system.

Automated inspection systems typically employ a manipulator (e.g., overhead gantry, multi-axis scanner, or robot) that scans an NDI end effector along the part being inspected. For single-sided inspection methods, such as pulse echo ultrasonic inspection, a single-arm robotic device having multiple degrees of freedom may be used to position and move an NDI end effector, such as a pulse echo ultrasonic inspection device, attached to the end of the robot arm.

An automated single-pass automated non-destructive inspection (NDI) system having flange, radius and web NDI probe assemblies is disclosed in U.S. Pat. No. 9,933,396. The design of that system allows for elongated composite members having lengthwise variation in shape, curvature and dimensions. The ultrasonic inspection apparatus herein has enough degrees of freedom to allow for local part movements in the roll, pitch, yaw, lateral and elevation directions while still maintaining proper probe alignment to the part. However, manufactured blade stiffeners may have twist that varies from one blade stiffener to another by an amount which exceeds the capability of the ultrasonic inspection apparatus to adjust, thereby necessitating that the inspector modify the robot programs for every part number in order to maintain proper ultrasonic coupling into the part.

SUMMARY

The technology proposed herein enhances the functionality of an automated single-pass NDI tool head by incorporating features that enable each of the flange, radius and web NDI probe assemblies to adjust their positions and orientations independently as the NDI tool head travels along the length of an elongated composite member (e.g., a blade stiffener). More specifically, each NDI probe assembly is able to translate along a first axis which is parallel to a Z axis of the NDI tool head, rotate along a second axis which is parallel to an X axis (perpendicular to the Z axis) of the NDI tool head, and rotate along a third axis, which third axis rotates as the NDI probe assembly rotates about the second axis in a plane which is perpendicular to the second axis (and X axis). These translational and rotational adjustments compensate for variations in the cross-sectional profile of the elongated composite member as the NDI tool head moves along the length of the elongated composite member.

In accordance with one embodiment, a system for inspecting blade stiffeners is designed to allow the position and orientation of the NDI tool head to adjust for changing twist, web—flange angle, web height, flange width, thickness, or contour in an elevational or lateral direction (e.g., curvature to reflect the shape of a wing skin). The enhanced capability to adjust the locations of the NDI probe assemblies independently eliminates the need to reprogram the automated robotic inspection tool when a blade stiffener that is being inspected exhibits unexpected geometry variation.

The subject matter disclosed in detail below is directed to methods and apparatus for non-destructive inspection of elongated composite members in a single scan pass using an automated NDI system. The system concept is fully automated by coupling an NDI tool head to a robot and using the robot to move the NDI tool head along the elongated composite member; and by integrating tooling fixtures that move out of the way as the NDI tool head travels along the length of the part during the inspection. The embodiments disclosed in detail below enable high production rates by providing a single-pass NDI system designed to inspect a part while it is stationary. This feature will reduce the amount of factory space used. In addition, incorporating robotic technology into the inspection provides a fully automated inspection to reduce or eliminate operator fatigue.

For the purpose of illustration and explanation, apparatus and methods for ultrasonic inspection of a generally T-shaped wing blade stiffener in a single scan pass (hereinafter "single pass") will be described in detail hereinafter. However, some of the principles and concepts embodied by the apparatus disclosed hereinafter can be applied in ultrasonic inspection of other elongated composite members having profiles that are not generally T-shaped. In the case where the elongated composite member is a wing blade stiffener comprising a flange intersected by a web to form radiused portions (a.k.a. "radii") on both sides of the intersection, an ultrasonic inspection tool head is provided that comprises two phased linear ultrasonic transducer arrays for inspecting the flange, two phased linear ultrasonic transducer arrays for inspecting the web, and two phased curved ultrasonic transducer arrays for inspecting the radiused portions.

Conventional composite structure cured with hard tooling results in composite radii that are well defined and repeatable. In contrast, the composite radii formed using soft tooling are not always well defined and may vary from part to part. In some cases, dimensional or contour variations may be greater than those that would result from using hard tooling. These larger variations make reliable inspection more difficult. In view of the deviation from circularity of soft-tooled composite radii, the terms "radius" and "radiused portion" as used hereinafter should be construed non-strictly to include non-circular profiles.

Although various embodiments of methods and apparatus for inspecting elongated composite members are described in some detail later herein, one or more of those embodiments may be characterized by one or more of the following aspects.

One aspect of the subject matter disclosed in detail below is an apparatus comprising: a tool frame assembly comprising first and second guide shafts oriented parallel to a Z axis of the tool frame assembly; first and second bearing block assemblies slidably coupled to the first and second guide shafts respectively and comprising first and second pivots respectively, the first and second pivots being rotatable about first and second axes of rotation which are parallel to an X axis perpendicular to the Z axis; and a frame assembly comprising first and second rotatable shafts which are coaxial with a third axis of rotation perpendicular to the X axis, the first and second rotatable shafts being rotatably and translatably coupled to the first and second pivots respectively for rotation about and translation along the third axis of rotation. The frame assembly is configured to support a pair of devices or instruments, such as a pair of NDI probes.

In accordance with one embodiment of the apparatus described in the immediately preceding paragraph, the first pivot comprises first and second pivot pins which are coaxial and the first bearing block assembly further comprises: a linear ball bearing disposed between the first rotatable shaft and the first pivot; first and second bearings that support the first and second pivot pins respectively of the first pin; and first and second linear bearings which are slidably coupled to the first guide shaft. In addition, the first frame assembly comprises a lower frame bracket; first and second linear slide tables which are translatable relative to the lower frame bracket along first and second linear paths which are mutually parallel; and third and fourth linear slide tables which are respectively translatable relative to the first and second linear slide tables along a third linear path which is perpendicular to the first and second linear paths.

Another aspect of the subject matter disclosed in detail below is an apparatus for non-destructive inspection of an elongated composite member, the apparatus comprising: a tool frame assembly comprising first and second guide shafts oriented parallel to a Z axis of the tool frame assembly; first and second bearing block assemblies slidably coupled to the first and second guide shafts respectively and comprising first and second pivots respectively, the first and second pivots being rotatable about first and second axes of rotation which are parallel to an X axis perpendicular to the Z axis; and a first NDI probe assembly comprising a first probe frame assembly and first and second NDI probes, wherein the first probe frame assembly comprises first and second rotatable shafts which are coaxial with a third axis of rotation perpendicular to the X axis, the first and second rotatable shafts being rotatably and translatably coupled to the first and second pivots respectively for rotation about and translation along the third axis of rotation. In accordance with one proposed implementation, the first and second NDI probes are respective ultrasonic transducer arrays.

In accordance with one embodiment of the apparatus described in the immediately preceding paragraph, the tool frame assembly further comprises third and fourth guide shafts oriented parallel to the Z axis of the tool frame assembly, a first lower guide shaft spacer which maintains a spacing between the first and third guide shafts, and a second lower guide shaft spacer which maintains a spacing between the second and fourth guide shafts, and wherein the apparatus further comprises: third and fourth bearing block assemblies slidably coupled to the third and fourth guide shafts respectively and comprising third and fourth pivots respectively, the third and fourth pivots being rotatable about fourth and fifth axes of rotation which are parallel to the X axis; and a second NDI probe assembly comprising a second probe frame assembly and third and fourth NDI probes, wherein the second probe frame assembly comprises third and fourth rotatable shafts which are coaxial with a sixth axis of rotation perpendicular to the X axis, the third and fourth rotatable shafts being rotatably and translatably coupled to the third and fourth pivots respectively for rotation about and translation along the sixth axis of rotation.

In accordance with another embodiment, in addition to the features described in the two immediately preceding paragraphs, the tool frame assembly further comprises fifth and sixth guide shafts oriented parallel to the Z axis of the tool frame assembly, the first lower guide shaft spacer maintains a spacing between the third and fifth guide shafts, and the second lower guide shaft spacer maintains a spacing between the fourth and sixth guide shafts, and wherein the apparatus further comprises: fifth and sixth bearing block assemblies slidably coupled to the fifth and sixth guide shafts respectively and comprising fifth and sixth pivots respectively, the fifth and sixth pivots being rotatable about seventh and eighth axes of rotation which are parallel to the X axis; and a third NDI probe assembly comprising a third probe frame assembly and fifth and sixth NDI probes, wherein the third probe frame assembly comprises fifth and sixth rotatable shafts which are coaxial with a ninth axis of rotation perpendicular to the X axis, the fifth and sixth rotatable shafts being rotatably and translatably coupled to the fifth and sixth pivots respectively for rotation about and translation along the ninth axis of rotation.

Another aspect of the subject matter disclosed in detail below is an apparatus for non-destructive inspection of an elongated composite member, the apparatus comprising: a tool frame assembly comprising first through sixth guide shafts oriented parallel to a Z axis of the tool frame assembly; first through sixth bearing block assemblies slidably coupled to the first through sixth guide shafts respectively, wherein the first through sixth bearing block assemblies comprise respective pivots which are rotatable about respective axes of rotation which are parallel to an X axis, which X axis is perpendicular to the Z axis; a first NDI probe assembly comprising a first probe frame assembly and first and second NDI probes arranged for inspecting respective portions of a flange disposed on opposite sides of a web of a blade stiffener, wherein the first probe frame assembly comprises first and second rotatable shafts which are coaxial with a first axis of rotation perpendicular to the X axis, the first and second rotatable shafts being rotatably and translatably coupled to the respective pivots of the first and second bearing block assemblies for rotation about and translation along the first axis of rotation; a second NDI probe assembly comprising a second probe frame assembly and third and fourth NDI probes arranged for inspecting respective radiused portions of the blade stiffener which connect the web to the flange, wherein the second probe frame assembly comprises third and fourth rotatable shafts which are coaxial with a second axis of rotation perpendicular to the X axis, the third and fourth rotatable shafts being rotatably and translatably coupled to the respective pivots of the third and fourth bearing block assemblies for rotation about and translation along the second axis of rotation; and a third NDI probe assembly comprising a third probe frame assembly and fifth and sixth NDI probes arranged for inspecting the web of the blade stiffener, wherein the third probe frame assembly comprises fifth and sixth rotatable shafts which are coaxial with a third axis of rotation perpendicular to the X axis, the fifth and sixth rotatable shafts being rotatably and translatably coupled to the respective pivots of the fifth and sixth bearing block assemblies for rotation about and translation along the third axis of rotation.

In accordance with one embodiment of the apparatus described in the immediately preceding paragraph, each of the first through third probe frame assemblies comprises a lower frame bracket, first and second linear slide tables which are respectively translatable relative to the lower frame bracket along first and second linear paths which are mutually parallel, and third and fourth linear slide tables which are respectively translatable relative to the first and second linear slide tables along a third linear path which is perpendicular to the first and second linear paths.

In accordance with one proposed implementation, each pivot of the first through sixth bearing block assemblies comprises first and second pivot pins which are coaxial, and wherein each of the first through sixth bearing block assemblies further comprises: a linear ball bearing disposed between a respective one of the first through sixth rotatable shafts and the respective pivot; first and second bearings that support the first and second pivot pins respectively of the respective pivot; and first and second linear bearings which are slidably coupled to a respective guide shaft of the first through sixth guide shafts.

A further aspect of the subject matter disclosed in detail below is a method for automated non-destructive inspection of an elongated composite member having web, flange and radiused portions in a single pass, comprising: (a) coupling an NDI tool head to a connector plate of a robot; (b) placing the NDI tool head on an elongated composite member so that a flange NDI probe assembly, a radius NDI probe assembly, and a web NDI probe assembly of the NDI tool head are in contact with respective sections of the elongated composite member; (c) moving the NDI tool head along the elongated composite member by operation of the robot; (d) acquiring NDI data from the flange of the elongated composite member during step (c) using first and second NDI probes incorporated in the flange NDI probe assembly; (e) acquiring NDI data from the radiused portions of the elongated composite member during step (c) using third and fourth NDI probes incorporated in the radius NDI probe assembly; (f) acquiring NDI data from the web of the elongated composite member during step (c) using fifth and sixth NDI probes incorporated in the flange NDI probe assembly; (g) translating and rotating the flange NDI probe assembly relative to a frame of the NDI tool head during step (c) in response to changing forces and torques exerted on the flange NDI probe assembly by the elongated composite member; (h) translating and rotating the radius NDI probe assembly relative to the frame of the NDI tool head during step (c) in response to changing forces and torques exerted on the radius NDI probe assembly by the elongated composite member; and (i) translating and rotating the web NDI probe assembly relative to the frame of the NDI tool head during step (c) in response to changing forces and torques exerted on the web NDI probe assembly by the elongated composite member. The flange, radius and web NDI probe assemblies are: translated relative to the frame of the NDI tool head along respective first axes which are parallel to a Z axis of the frame of the NDI tool head; rotated relative to the frame of the NDI tool head along respective second axes which are parallel to an X axis of the frame of the NDI tool head, wherein the X axis is perpendicular to the Z axis; and rotated relative to the frame of the NDI tool head along respective third axes which rotate as the flange, radius and web NDI probe assemblies rotate about the second axes in respective planes which are perpendicular to the X axis. In accordance with one embodiment, the method further comprises pressing respective components of the flange NDI probe assembly, radius NDI probe assembly, and web NDI probe assembly against the elongated composite member during step (c) using pneumatic linear slide tables.

Other aspects of methods and apparatus for inspecting elongated composite members are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 4A is diagram representing a front elevational view of the NDI tool head depicted in FIG. 3.

FIGS. 4B through 4D are diagrams representing a front elevational view of the NDI tool head depicted in FIG. 4A at three stages during upward displacement of one bearing block assembly while the other bearing block assembly remains stationary.

Reference will hereinafter be made to the drawings in which similar elements in different drawings bear the same reference numerals.

DETAILED DESCRIPTION

Illustrative embodiments of methods and apparatus for automated inspection of elongated composite members are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of apparatus and methods for ultrasonic inspection of elongated composite members will now be described with reference to the inspection of generally T-shaped wing blade stiffeners. However, the apparatus and methods disclosed herein may also be used to ultrasonically inspect composite stiffeners having other profiles and elongated composite members other than stiffeners.

Figure 1:
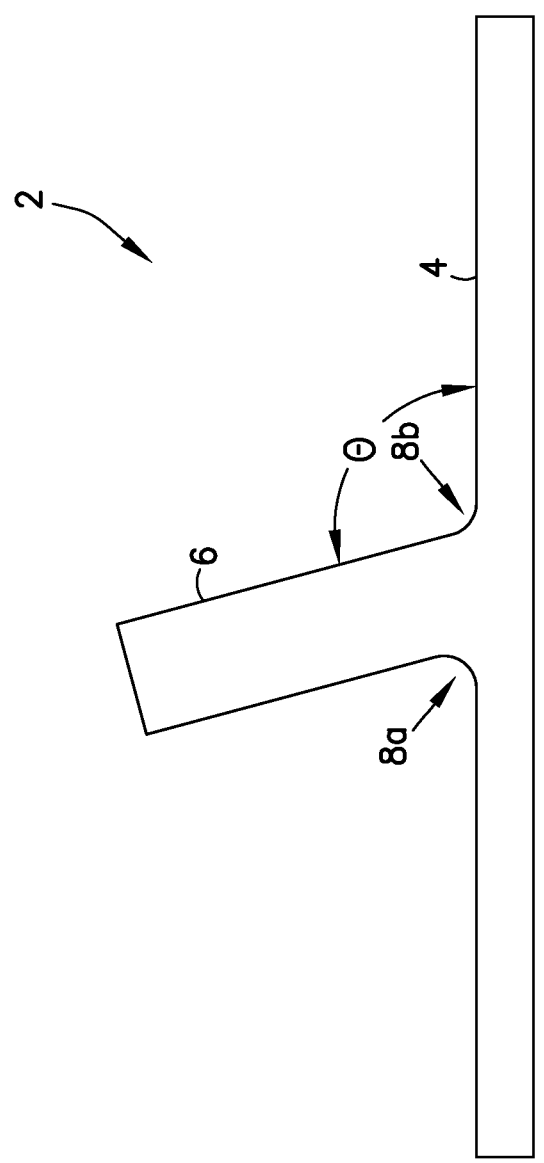
FIG. 1 is a diagram showing a representative profile of a composite blade stiffener. The profile typically varies from a true T-shape as the web angle diverges from perpendicular along the length of the blade stiffener.

FIG. 1 is a diagram showing a representative profile of a composite blade stiffener 2 (hereinafter "blade stiffener") comprising a flange 4 and a web 6 that intersects flange 4. In the area of the intersection, the blade stiffener 2 has left and right radiused portions 8a and 8b. Although not apparent from FIG. 1, it should be appreciated that blade stiffener 2 may have a profile that varies along its length. At some locations, the profile may be T-shaped; at other locations the profile may vary from T-shaped, e.g., the web—flange angle θ diverges from 90° along the length of blade stiffener 2 (as depicted in FIG. 1). For example, the web-flange angle θ may change by ±15°. A blade stiffener profile having a web angle in this range will be referred to herein as a "generally T-shaped blade stiffener".

Figure 2:
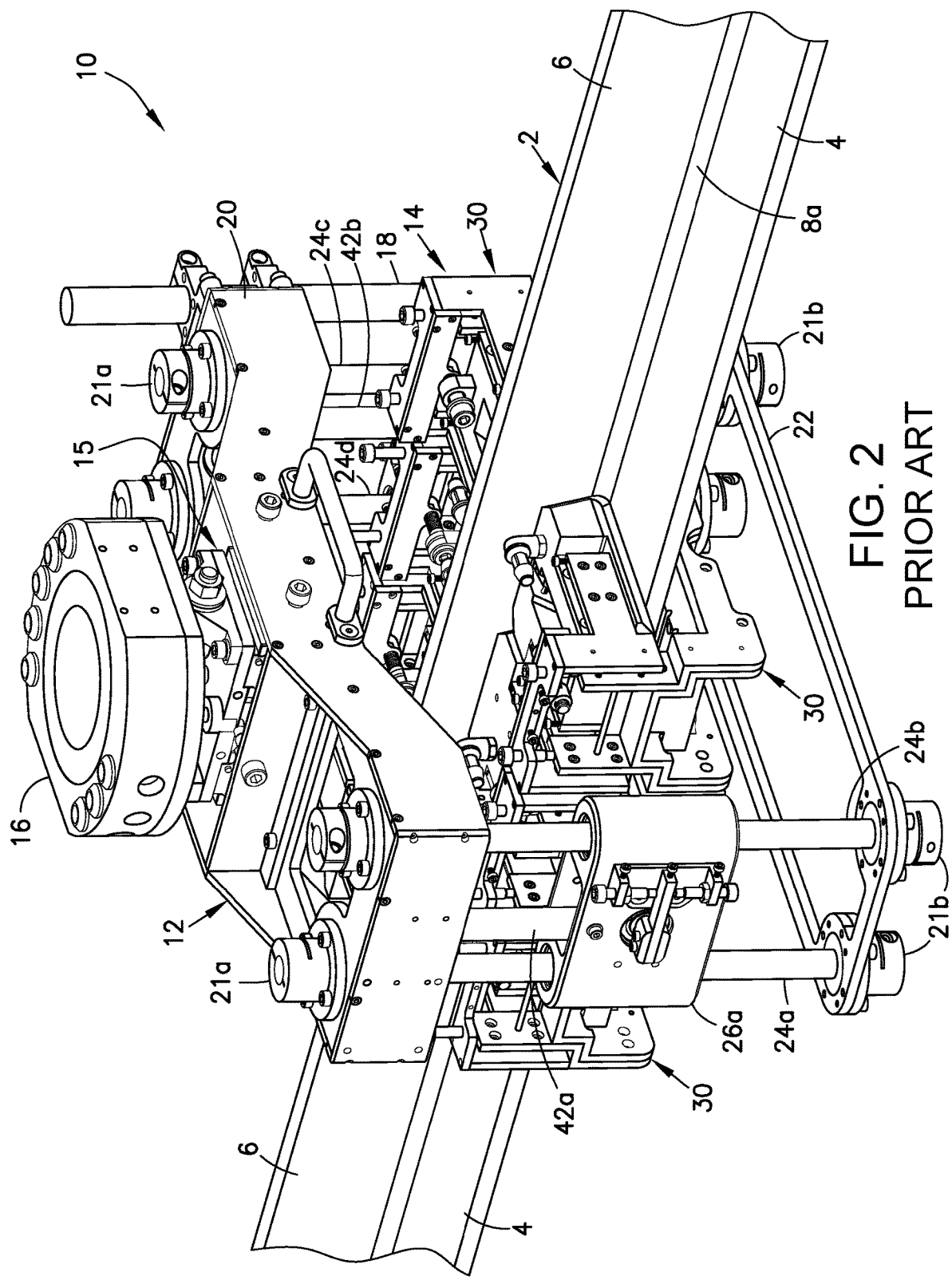
FIG. 2 is a diagram representing a three-dimensional view of an NDI tool head mounted to a generally T-shaped blade stiffener.

The blade stiffener 2 can be inspected in one pass using an NDI tool head 10 of the type depicted in FIG. 2 and disclosed in U.S. Pat. No. 9,933,396. The NDI tool head 10 is designed to be mounted to the blade stiffener 2. The NDI tool head 10 depicted in FIG. 2 comprises a tool frame assembly 12 and an NDI probe assembly 14 that is carried by the tool frame assembly 12. The tool frame assembly 12 comprises a quick-release tool-side connector plate 16, an upper frame 20, and a gimbal assembly 15 which couples the upper frame 20 to the tool-side connector plate 16. As will be discussed later with reference to FIG. 12, tool-side connector plate 16 is connected to a compatible robot-side connector plate 114.

During a single scan pass, the NDI tool head 10 travels along the length of the blade stiffener 2 from one end to the other end, scanning the flange 4, the web 6 and the radiused portions (only radiused portion 8a is visible in FIG. 2). In accordance with one implementation, the NDI probe assembly 14 includes two phased linear ultrasonic transducer arrays for inspecting the flange 4, two phased linear ultrasonic transducer arrays for inspecting the web 6, and two phased curved ultrasonic transducer arrays for inspecting the radiused portions 8a, 8b, which ultrasonic transducer arrays are not visible in FIG. 2. The NDI probe assembly 14 further comprises a probe housing assembly 30 which adjustably supports the ultrasonic transducer arrays.

Figure 2A:
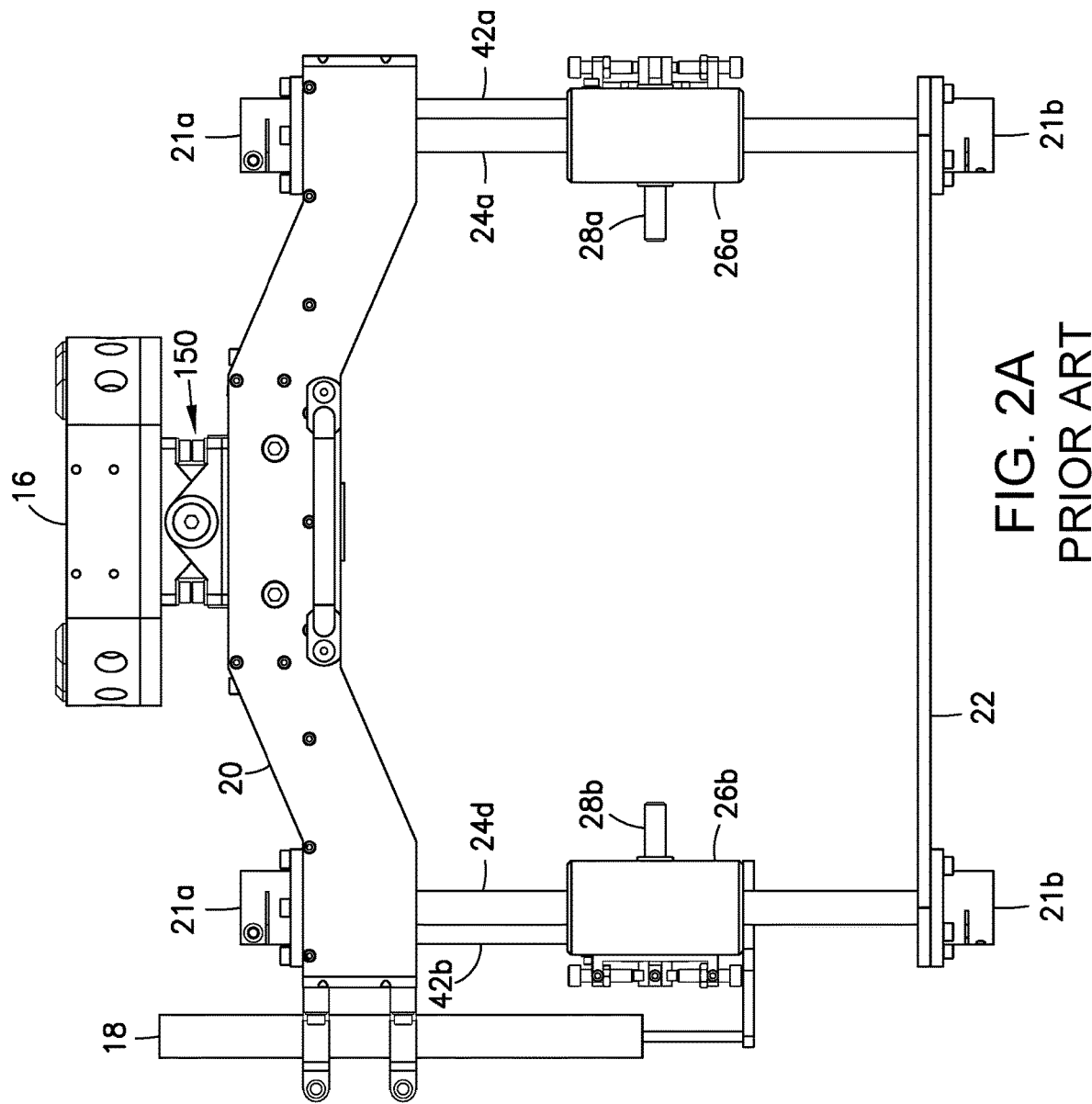
FIG. 2A is a diagram representing an elevational view of a tool frame assembly incorporated in the tool head depicted in FIG. 2.

Still referring to FIG. 2, the tool frame assembly 12 further comprises four guide shafts 24a-24d each having one end fixedly coupled (i.e., attached) to the upper frame 20 by means of respective upper shaft mounts 21a, and a lower frame 22 fixedly coupled to the other ends of guide shafts 24a-24d by means of respective lower shaft mounts 21b. In a preferred embodiment, the axes of guide shafts 24a-24d are all parallel to a Z axis of the frame of reference of the tool frame assembly 12. The tool frame assembly 12 further comprises a pair of bearing block assemblies 26a and 26b (best seen in FIG. 2A) which are coupled to the upper frame 20 by means of respective constant force spring assemblies 42a and 42b. In addition, bearing block assembly 26a is translatably coupled to guide shafts 24a and 24b by means of respective pairs of linear bearings (not shown in FIG. 2); bearing block assembly 26b (visible in FIG. 2A) is translatably coupled to guide shafts 24c and 24d by means of respective pairs of linear bearings (not shown). The bearing block assemblies 26a and 26b (which support the NDI probe assembly 14) can translate in tandem in the Z direction while the constant force spring assemblies 42a and 42b exert lifting forces thereon. As best seen in FIG. 2A, the displacement of bearing block assembly 26b in the Z direction may be measured by a linear variable differential transformer 18 which is integrated in the tool frame assembly 12. The displacements of the bearing block assemblies 26a and 26b will be equal.

As seen in FIG. 2A, the bearing block assembly 26a comprises a rotatable shaft 28a, while the bearing block assembly 26b comprises a rotatable shaft 28b. The rotatable shafts 28a and 28b have a common axis of rotation, which may be treated as the Y axis (perpendicular to the Z axis) in the frame of reference of the tool frame assembly 12. The probe housing assembly 30 of the NDI probe assembly 14 is clamped to the rotatable shafts 28a and 28b. As a result of this design, the probe housing assembly 30 (seen in FIG. 2), which is clamped to rotatable shafts 28a and 28b, can rotate about the Y axis of the tool frame assembly 12.

The system depicted in FIGS. 2 and 2A enables automated inspection of elongated composite members having lengthwise variation in shape, curvature and dimensions. The NDI tool head 10 has a sufficient number of degrees of freedom to allow for local part movements in the roll, pitch, yaw, lateral and elevation directions while still maintaining proper probe alignment to the part. However, manufactured blade stiffeners of the type depicted in FIGS. 1 and 2 may have twist that varies from one blade stiffener to another by an amount which exceeds the capability of the NDI probes of the NDI tool head 10 to adjust their respective positions and orientations. If the part-to-part variation is sufficiently great, then the inspector must modify the robot program for every part number in order to maintain proper ultrasonic coupling into the part.

The technology proposed herein enhances the functionality of an automated single-pass blade NDI system by incorporating features that enable each of the flange, radius and web NDI probe assemblies to adjust their positions and orientations independently as the NDI tool head travels along the length of an elongated composite member (e.g., a blade stiffener). More specifically, each NDI probe assembly is able to translate along a first axis which is parallel to a Z axis of the NDI tool head, rotate along a second axis which is parallel to an X axis (perpendicular to the Z axis) of the NDI tool head, and rotate along a third axis, which third rotates as the NDI probe assembly rotates about the second axis in a plane which is perpendicular to the X axis. These translational and rotational adjustments compensate for the blade stiffener rotating with respect to the base of the robot frame as the robot moves the inspection head along the length of the blade stiffener. The enhanced capability to adjust the locations of the flange, radius and web NDI probe assemblies independently eliminates the need to reprogram the automated robotic inspection tool when an elongated composite blade stiffener that is being inspected exhibits unexpected geometry variation.

Figure 3:
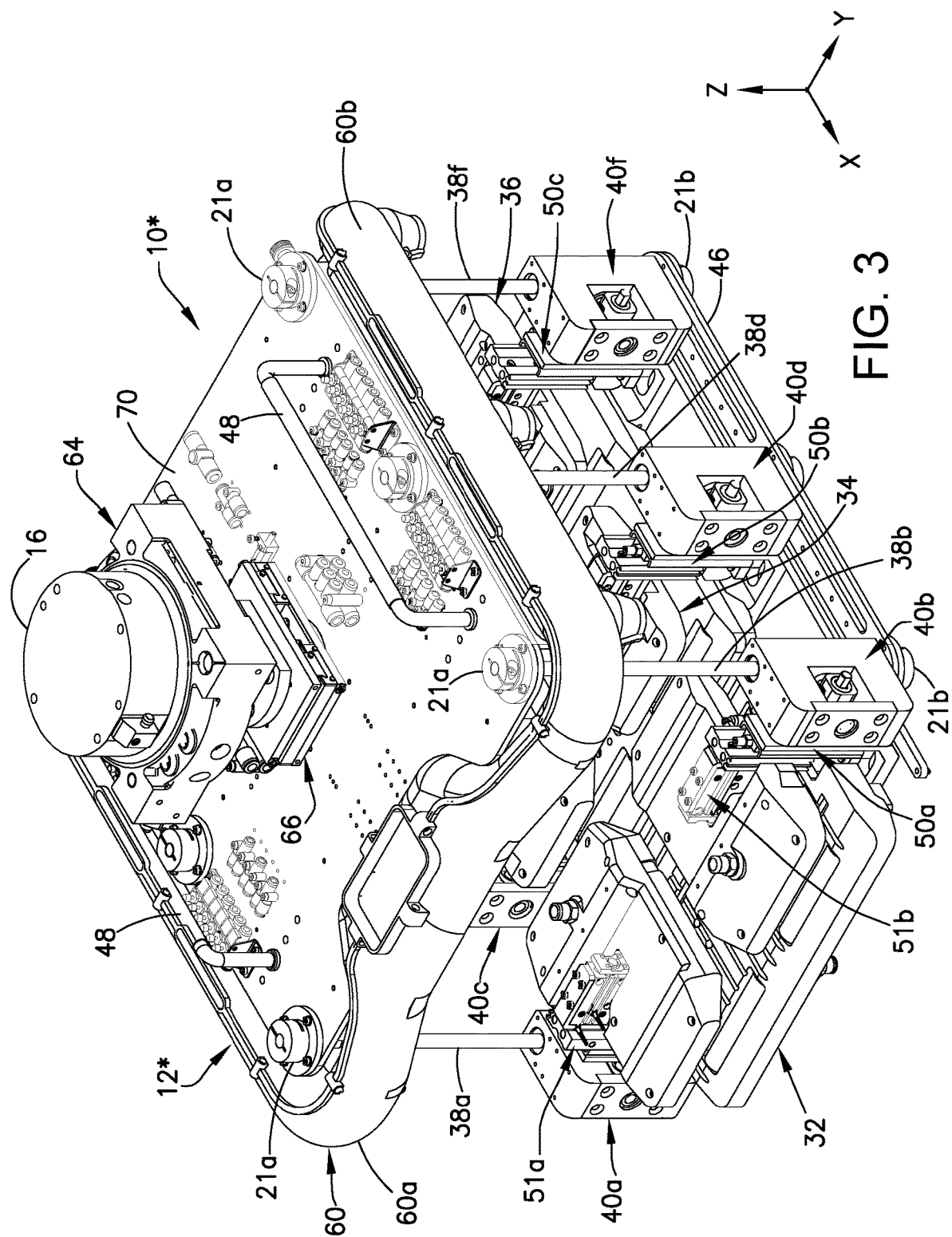
FIG. 3 is a diagram representing a three-dimensional view of an NDI tool head in accordance with one embodiment.

FIG. 3 is a diagram representing a three-dimensional view of an improved NDI tool head 10* in accordance with one embodiment. The NDI tool head 10* is shown in isolation. The NDI tool head 10 depicted in FIG. 3 includes a tool frame assembly 12* and three independently movable NDI probe assemblies which are supported by the tool frame assembly 12*: flange NDI probe assembly 32, radius NDI probe assembly 34 and web NDI probe assembly 36. The flange NDI probe assembly 32 has two phased linear ultrasonic transducer arrays (not visible in FIG. 3) for inspecting the flange of a blade stiffener; the web NDI probe assembly 36 has two phased linear ultrasonic transducer arrays (not visible in FIG. 3) for inspecting the web of the blade stiffener; and the radius NDI probe assembly 34 has two phased curved ultrasonic transducer arrays (not visible in FIG. 3) for inspecting the radiused portions of the blade stiffener.

The tool frame assembly 12* further includes a quick-release tool-side connector plate 16, a collision sensor 64 attached to the connector plate 16, a frame adapter assembly 66 suspended from the collision sensor 64 and a frame main plate 70 which is attached to the frame adapter assembly 66. The frame adapter assembly 66 includes a pair of linear slides which enable the frame main plate 70 to translate relative to the collision sensor 64 along a Y axis of the frame of reference of the tool frame assembly 12*. The tool frame assembly 12* further includes pair of handles 48 which enable the NDI tool head 10* to be lifted manually. The tool frame assembly 12* further includes a cable conduit assembly 60 comprising a left conduit 60a and a right conduit 60b. Various electrical cables and pneumatic hoses pass through the cable conduit assembly 60 to avoid entanglements with other devices.

Still referring to FIG. 3, the tool frame assembly 12* further includes six guide shafts 38a-38f each having one end fixedly coupled (i.e., attached) to the frame main plate 70 by means of respective upper shaft mounts 21a and a pair of lower guide shaft spacers 44 and 46 (lower guide shaft spacer 44 is not visible in FIG. 3, but see FIG. 3B) fixedly coupled to the other ends of guide shafts 38a-38c and 38d-38f respectively by means of respective lower shaft mounts 21b. The axes of guide shafts 38a-38f are all parallel to a Z axis of the frame of reference of the tool frame assembly 12*. The lower guide shaft spacer 44 maintains the spacing between guide shafts 38a-38c on the left side of the tool frame assembly 12*; the lower guide shaft spacer 46 maintains the spacing between guide shafts 38d-38f on the right side of the tool frame assembly 12*.

The tool frame assembly 12* further includes six bearing block assemblies 40a-40f which are respectively translatably coupled to guide shafts 38a-38f by means of respective pairs of linear bearings (not shown in FIG. 3). The bearing block assemblies 40a and 40b support the flange NDI probe assembly 32; the bearing block assemblies 40c and 40d support the radius NDI probe assembly 34; and the bearing block assemblies 40e and 40f support the web NDI probe assembly 36. All of the bearing block assemblies 40a-40f are independently slidable up or down along the respective guide shafts 38a-38f.

Still referring to FIG. 3, each of the NDI probe assemblies includes a respective probe frame assembly comprising a pair linear pneumatic slide assemblies 51a and 51b coupled to respective bearing block assemblies. The flange NDI probe assembly 32 includes a probe frame assembly 50a that is coupled to bearing block assemblies 40a and 40b. The radius NDI probe assembly 34 includes a probe frame assembly 50b that is coupled to bearing block assemblies 40c and 40d. The web NDI probe assembly 36 includes a probe frame assembly 50c that is coupled to bearing block assemblies 40e and 40f. The probe frame assemblies 50a-50c are able to independently adjust their positions and orientations in response to forces and torques exerted on the respective NDI probe assemblies by the blade stiffener as the NDI toll head 10* travels along the length of the blade stiffener.

Figure 3A:
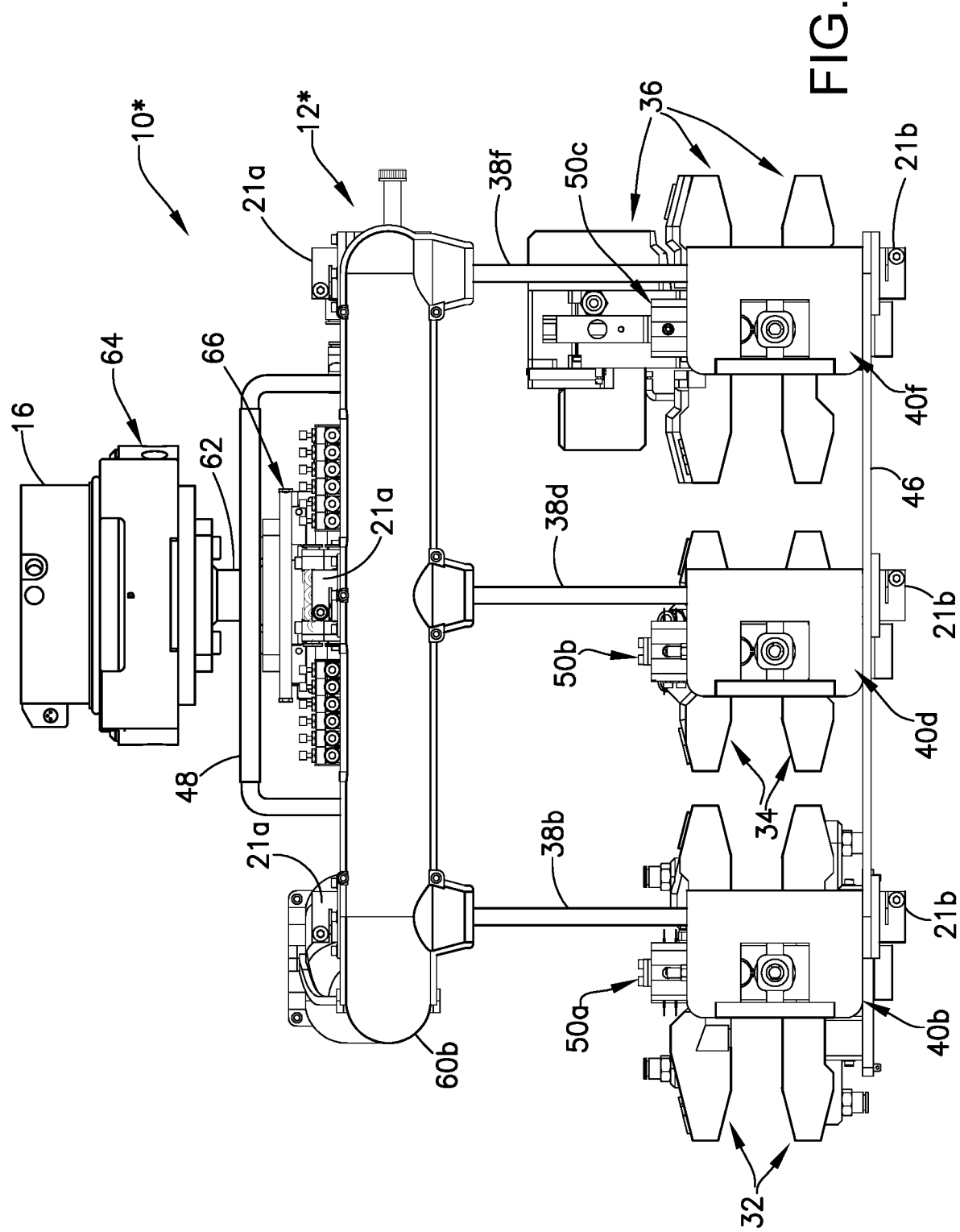
FIG. 3A is a diagram representing a side elevational view of the NDI tool head depicted in FIG. 3. All of the bearing block assemblies are shown in their respective lowermost vertical positions.

FIG. 3A is a diagram representing a side elevational view of the NDI tool head 10* depicted in FIG. 3. In this view, it can be seen that the frame adapter assembly 66 is attached to the collision sensor 64 by means of a welded pipe stand 62. In the state depicted in FIG. 3, all bearing block assemblies 40a-40f are in their respective lowermost vertical positions. In particular, FIG. 3A shows bearing block assemblies 40b, 40d and 40f all in contact with lower guide shaft spacer 46. In this state, the convention is adopted herein that the angles of inclination of the probe frame assemblies 50a-50c is 0 degrees relative to the Y axis of the tool frame assembly 12*.

Figure 3B:
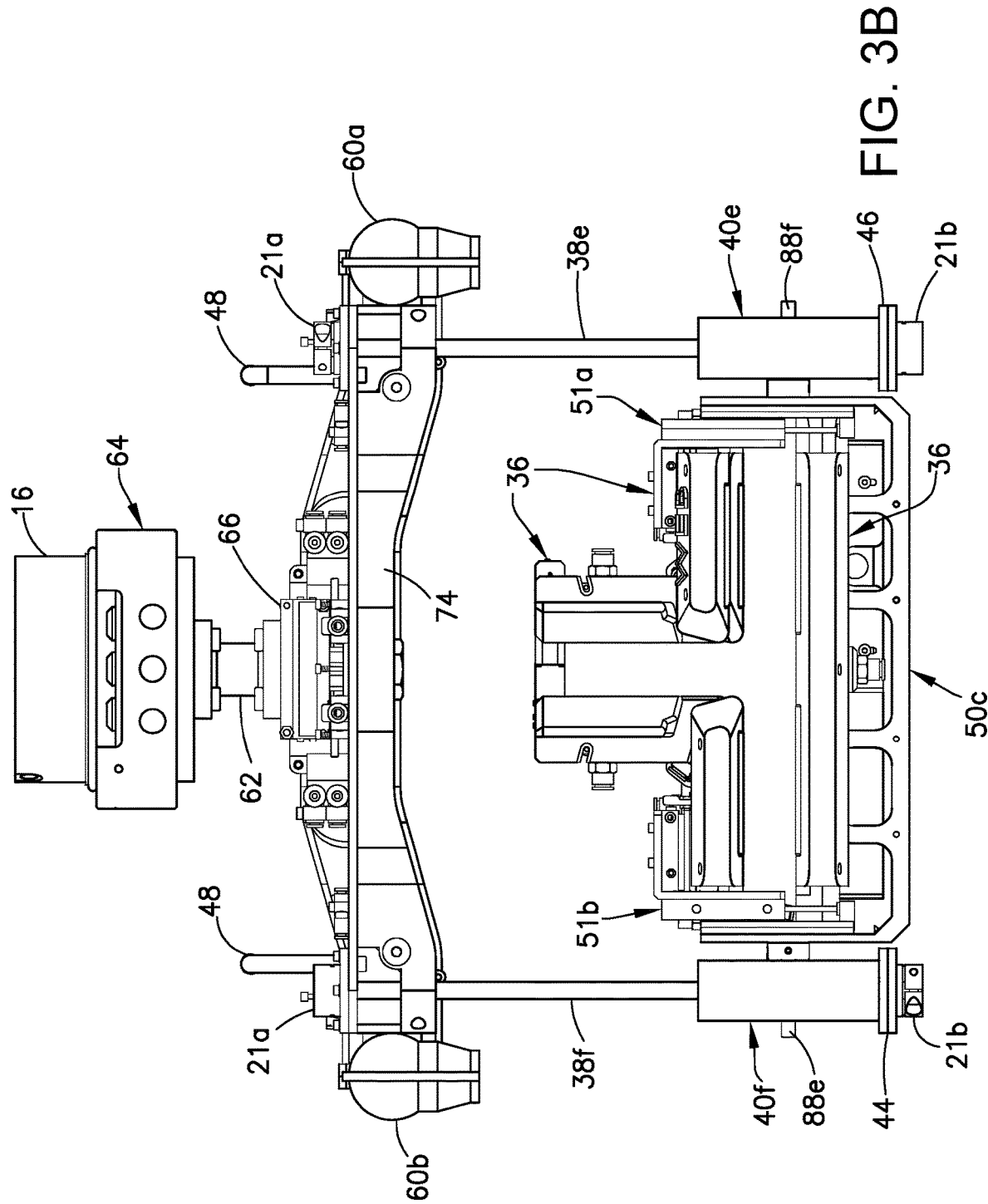
FIG. 3B is a diagram representing a rear elevational view of the NDI tool head depicted in FIG. 3.

FIG. 3B is a diagram representing a rear elevational view of the NDI tool head 10* depicted in FIG. 3. This view shows the main plate stiffener 74, which was not visible in FIGS. 3 and 3A. The frame main plate 70 and the cable conduit assembly 60 (see FIG. 3) are both attached to and supported by main plate stiffener 74. In accordance with one implementation, the main plate stiffener 74 is an integrally formed part in the shape of an annular ring with six radial arms which respectively terminate in proximity to the six upper shaft mounts 21a.

As seen in FIG. 3B, the probe frame assembly 50c of web NDI probe assembly 36 is clamped at opposite ends thereof to a pair of mutually coaxial rotatable shafts 88e and 88f which are respectively slidably and rotatably coupled to the bearing block assemblies 40e and 40f. The bearing block assemblies 40e and 40f are independently slidable along guide shafts 38e and 38f respectively. During unequal translations of the bearing block assemblies 40e and 40f, the probe frame assembly 50c translates and rotates. In particular, the probe frame assembly 50c is free to rotate about an axis which is parallel to the X axis and also about a common axis of rotation of the rotatable shafts 88e and 88f. The probe frame assembly 50c is also able to adjust its position by translating a short distance along the common axis of rotatable shafts 88e and 88f as the probe frame assembly 50c rotates.

The probe frame assembly 50b of radius NDI probe assembly 34 is able to adjust its position and orientation in a similar manner, being clamped to rotatable shafts 88c and 88d (not shown in FIG. 3B, but see FIG. 4D) which are respectively slidably and rotatably coupled to the bearing block assemblies 40c and 40d.

FIG. 4A is diagram representing a front elevational view of the NDI tool head 10* depicted in FIG. 3. As seen in FIG. 4A, the probe frame assembly 50a of flange NDI probe assembly 32 is clamped at opposite ends thereof to a pair of mutually coaxial rotatable shafts 88a and 88b which are respectively slidably and rotatably coupled to the bearing block assemblies 40a and 40b. The bearing block assemblies 40a and 40b are independently slidable along guide shafts 38a and 38b respectively. During unequal translations of the bearing block assemblies 40a and 40b, the probe frame assembly 50a translates and rotates. In particular, the probe frame assembly 50a is free to rotate about an axis which is parallel to the X axis and also about a common axis of rotation of the rotatable shafts 88a and 88b. The probe frame assembly 50a is also able to adjust its position by translating a short distance along the common axis of rotatable shafts 88a and 88b as the probe frame assembly 50a rotates.

Figure 4B:
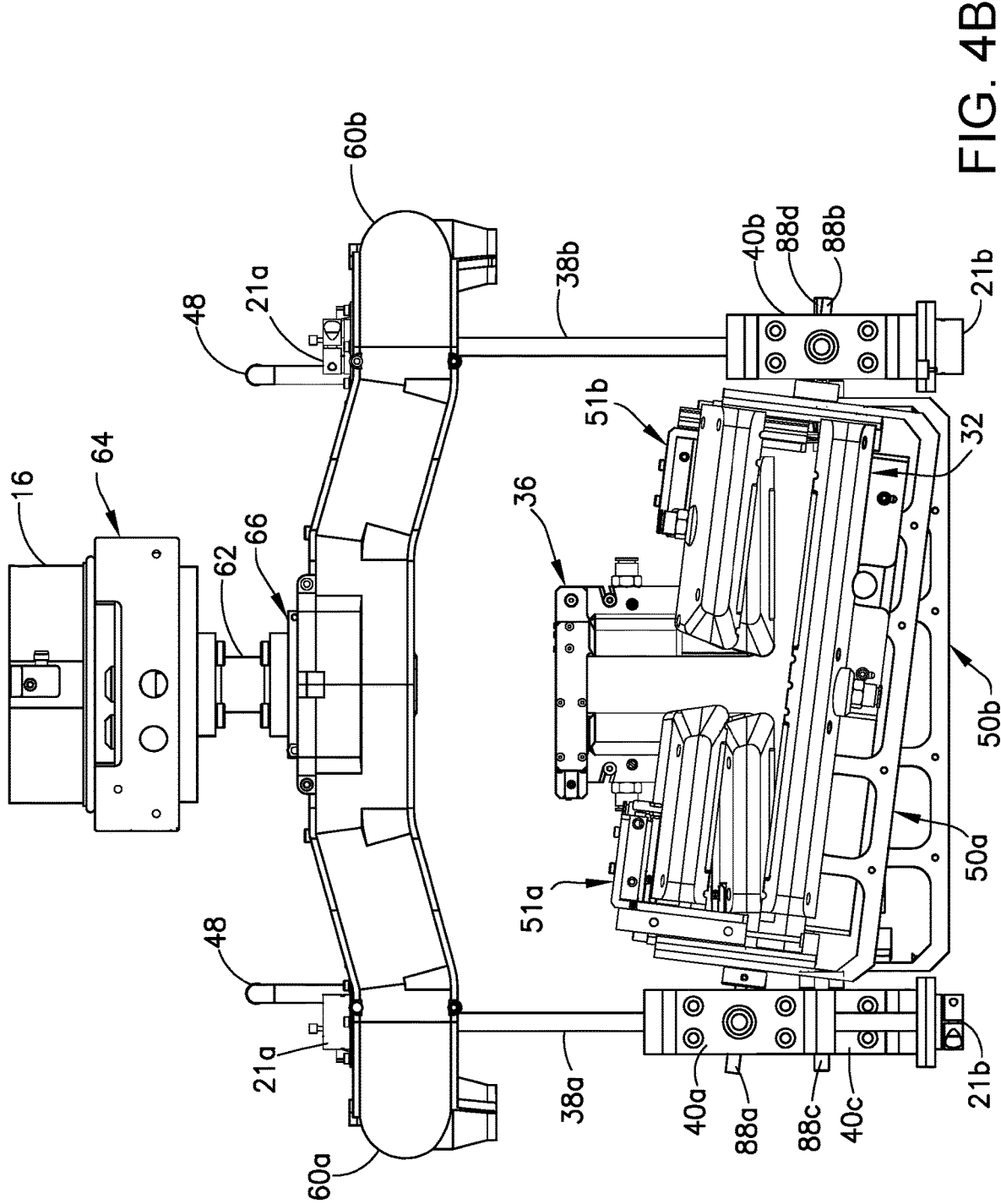

FIGS. 4B through 4D are diagrams representing a front elevational view of the NDI tool head 10* depicted in FIG. 4A at three stages during upward displacement of bearing block assembly 40a while bearing block assembly 40b remains stationary. FIG. 4B shows the flange NDI probe assembly 32 in a first location following a first upward displacement of the bearing block assembly 40a. During this first upward displacement of the bearing block assembly 40a, the flange NDI probe assembly 32 both rotates and translates to arrive at the location depicted in FIG. 4B. In the scenario depicted in FIG. 4B, the radius and web NDI probe assemblies 34 and 36 have not moved. FIG. 4C shows the flange NDI probe assembly 32 in a second location following a second upward displacement of the bearing block assembly 40a from the vertical position seen in FIG. 4B to the vertical position seen in FIG. 4C. During this second upward displacement of the bearing block assembly 40a, the flange NDI probe assembly 32 both rotates and translates to arrive at the location depicted in FIG. 4C. FIG. 4D shows the flange NDI probe assembly 32 in a third location following a third upward displacement of the bearing block assembly 40a from the vertical position seen in FIG. 4C to the vertical position seen in FIG. 4D. During this third upward displacement of the bearing block assembly 40a, the flange NDI probe assembly 32 both rotates and translates to arrive at the location depicted in FIG. 4D.

As best seen in FIGS. 4C and 4D, the flange NDI probe assembly 32 is capable of moving independently of the radius NDI probe assembly 34 and web NDI probe assembly 36. Likewise, both of the radius and web NDI probe assemblies 34 and 36 are capable of moving in the same manner depicted in FIGS. 4B-4D independently of each other and independently of the flange NDI probe assembly 32.

Figure 5:
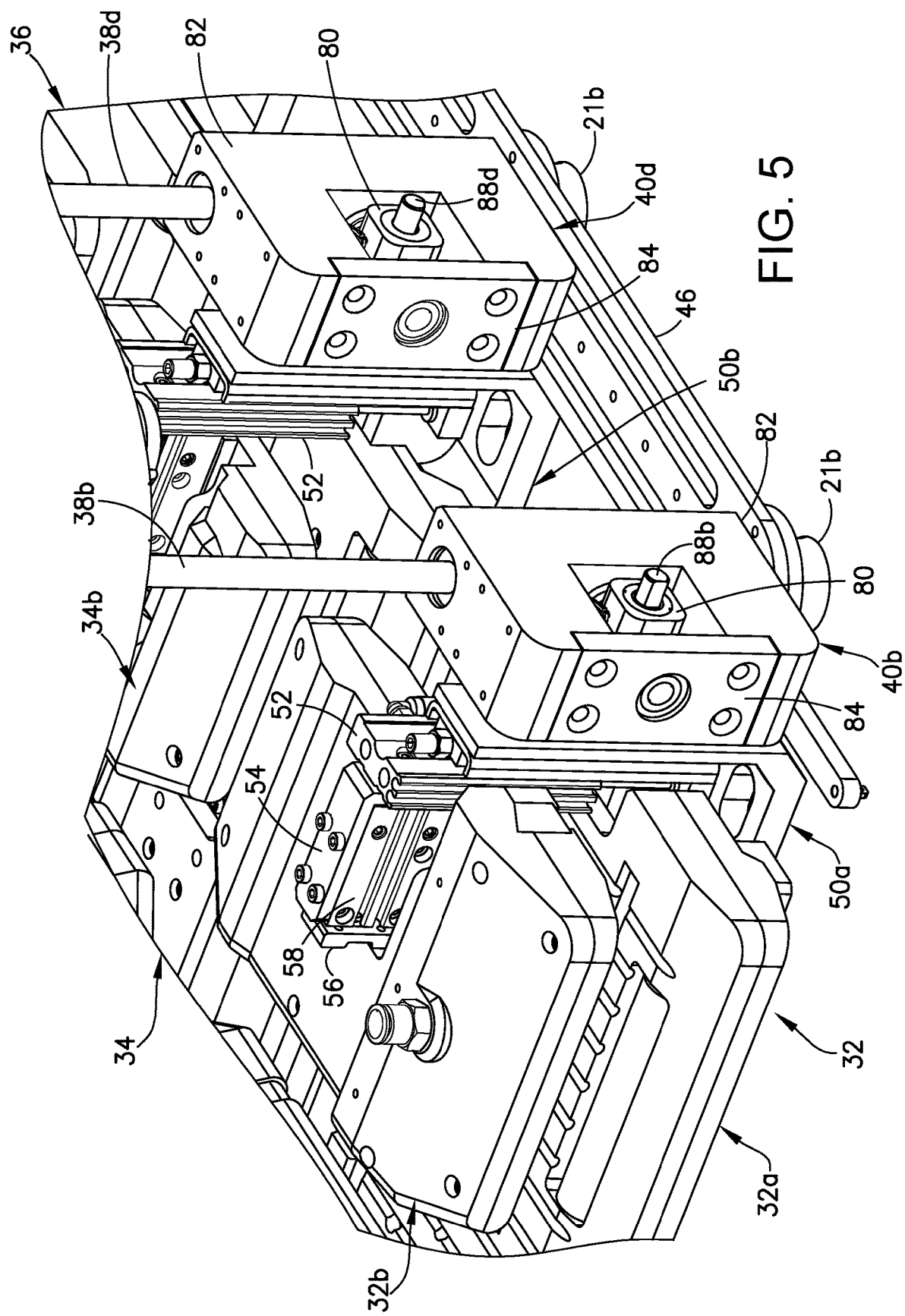
FIG. 5 is a diagram representing a three-dimensional view with enlarged scale of a portion of the NDI tool head depicted in FIG. 3.

FIG. 5 is a diagram representing a three-dimensional view with enlarged scale of a portion of the NDI tool head 10* depicted in FIG. 3. Only portions of the NDI probe assemblies are shown in FIG. 5. In addition, only bearing block assemblies 40b and 40d are shown in FIG. 5. Each of the bearing block assemblies includes a respective bearing block 82 and a respective bearing holder 84 which is fastened to the respective bearing block 82. The bearings inside each bearing block assembly will be described below with reference to FIGS. 7 and 7A.

Referring to FIG. 5, bearing block assembly 40b includes a pivot 80 that supports the rotatable shaft 88b of the flange NDI probe assembly 32. The pivot 80 is rotatable about an axis which is parallel to the X axis of the tool frame assembly 12*. The rotatable shaft 88b is rotatable about an axis that is perpendicular to the axis of rotation of the pivot 80. One end of probe frame assembly 50a of the flange NDI probe assembly 32 is clamped to the rotatable shaft 88b. The other end of probe frame assembly 50a is clamped to rotatable shaft 88a (not shown in FIG. 5, but see FIGS. 4A-4D) of the flange NDI probe assembly 32, which is supported by bearing block assembly 40a in a similar manner. The probe frame assembly 50a includes the following components: a lower frame bracket 68 which is clamped to the rotatable shafts 88a and 88b; a linear pneumatic slide table 52 that is slidable relative to lower frame bracket 68 along a first axis of translation which is perpendicular to the axis of rotation of the rotatable shaft 88b; a cylinder bracket 54 which is attached to the linear pneumatic slide table 52; a cylinder 58 which is attached to and carried by the cylinder bracket 54, and a linear pneumatic slide table 56 that is slidable along a second axis of translation which is perpendicular to the first axis of translation. FIG. 5 shows a right upper subassembly 32b of the flange NDI probe assembly 32 translatably coupled to one end of the lower frame bracket 68 of probe frame assembly 50a. The left upper subassembly 32a of the flange NDI probe assembly 32 (shown in FIG. 8) is translatably coupled to the other end of the lower frame bracket 68 of probe frame assembly 50a in a similar manner.

Still referring to FIG. 5, bearing block assembly 40d includes a pivot 80 that supports the rotatable shaft 88d of the radius NDI probe assembly 34. The pivot 80 is rotatable about an axis which is parallel to the X axis of the tool frame assembly 12*. The rotatable shaft 88d is rotatable about an axis that is perpendicular to the axis of rotation of the pivot 80. One end of probe frame assembly 50b of the radius NDI probe assembly 34 is clamped to the rotatable shaft 88b. The other end of probe frame assembly 50b is clamped to rotatable shaft 88c (not shown in FIG. 5, but see FIGS. 4B-4D) of the radius NDI probe assembly 34, which is supported by bearing block assembly 40c in a similar manner. The probe frame assembly 50b includes the same components arranged in the same configuration as described above for probe frame assembly 50b. FIG. 5 shows a right upper subassembly 34b of the radius NDI probe assembly 34 translatably coupled to one end of the lower frame bracket 68 of probe frame assembly 50b. The left upper subassembly 34a of the radius NDI probe assembly 34 (shown in FIG. 10)

is translatably coupled to the other end of the lower frame bracket 68 of probe frame assembly 50*b* in a similar manner.

Figure 6:
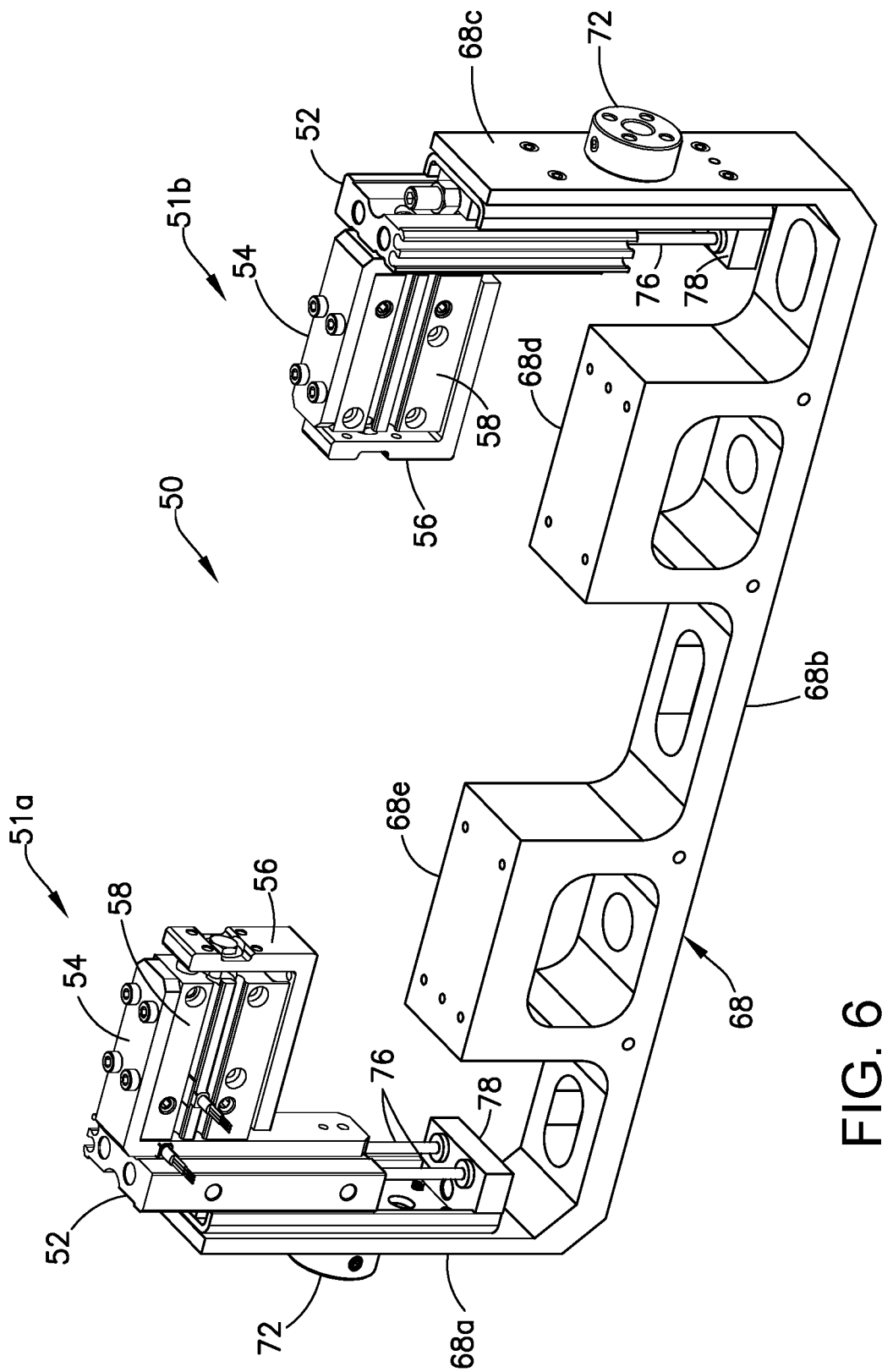
FIG. 6 is a diagram representing a three-dimensional view of a probe frame assembly in accordance with one embodiment. Three probe frame assemblies of the type depicted in FIG. 6 are incorporated in the NDI tool head depicted in FIG. 3.

FIG. 6 is a diagram representing a three-dimensional view of a probe frame assembly 50 in accordance with one embodiment. The probe frame assemblies 50*a*-50*c* of the flange, radius and web NDI probe assemblies may all be constructed in accordance with the configuration depicted in FIG. 6. The probe frame assembly 50 includes a lower frame bracket 68 having a straight base beam 68*b* and straight vertical arms 68*a* and 68*c* which extend upward in parallel from opposing ends of the base beam 68*b*. The vertical arms 68*a* and 68*c* may be joined (e.g., welded) to or integrally formed with the base beam 68*b*. The lower frame bracket 68 further includes a pair of mounting stands 68*d* and 68*e* to which a lower subassembly of an NDI probe assembly is attached. The probe frame assembly 50 further includes a pair of shaft collars 72 which clamp the vertical arms 68*a* and 68*c* to respective rotatable shafts (not shown in FIG. 6). In addition, the lower frame bracket 68 includes a pair of guide shaft support plates 78 integrally formed with the vertical arms 68*a* and 68*c* respectively. Each guide shaft support plate 78 supports a respective pair of mutually parallel guide shafts 76.

The probe frame assembly 50 further includes respective linear pneumatic slide assemblies 51*a* and 51*b* which are coupled to respective bearing block assemblies. Each of the linear pneumatic slide assemblies 51*a* and 51*b* includes the following components: a linear pneumatic slide table 52 that is slidably coupled to a pair of guide shafts 76; a cylinder bracket 54 which is attached to the linear pneumatic slide table 52; a cylinder 58 which is attached to and carried by the cylinder bracket 54, and a linear pneumatic slide table 56 that is slidable along an axis of translation which is perpendicular to the guide shafts 76. As will be described in more detail later with reference to FIGS. 9-11, respective lower subassemblies of the flange, radius and web NDI probe assemblies are attached to the mounting stands 68*d* and 68*e* of respective probe frame assemblies 50*a*-50*c*. In addition, respective pairs of left and right upper subassemblies of the flange, radius and web NDI probe assemblies are respectively attached to the pair of linear pneumatic slide tables 56 of respective probe frame assemblies 50*a*-50*c*. During an automated inspection procedure, the linear pneumatic slide assemblies 51*a* and 51*b* are operated by controlling the supply of pressurized air in a manner that presses the left and right upper subassemblies downward into contact with the flange of the blade stiffener and inward into contact with the web of the blade stiffener.

Figure 7:
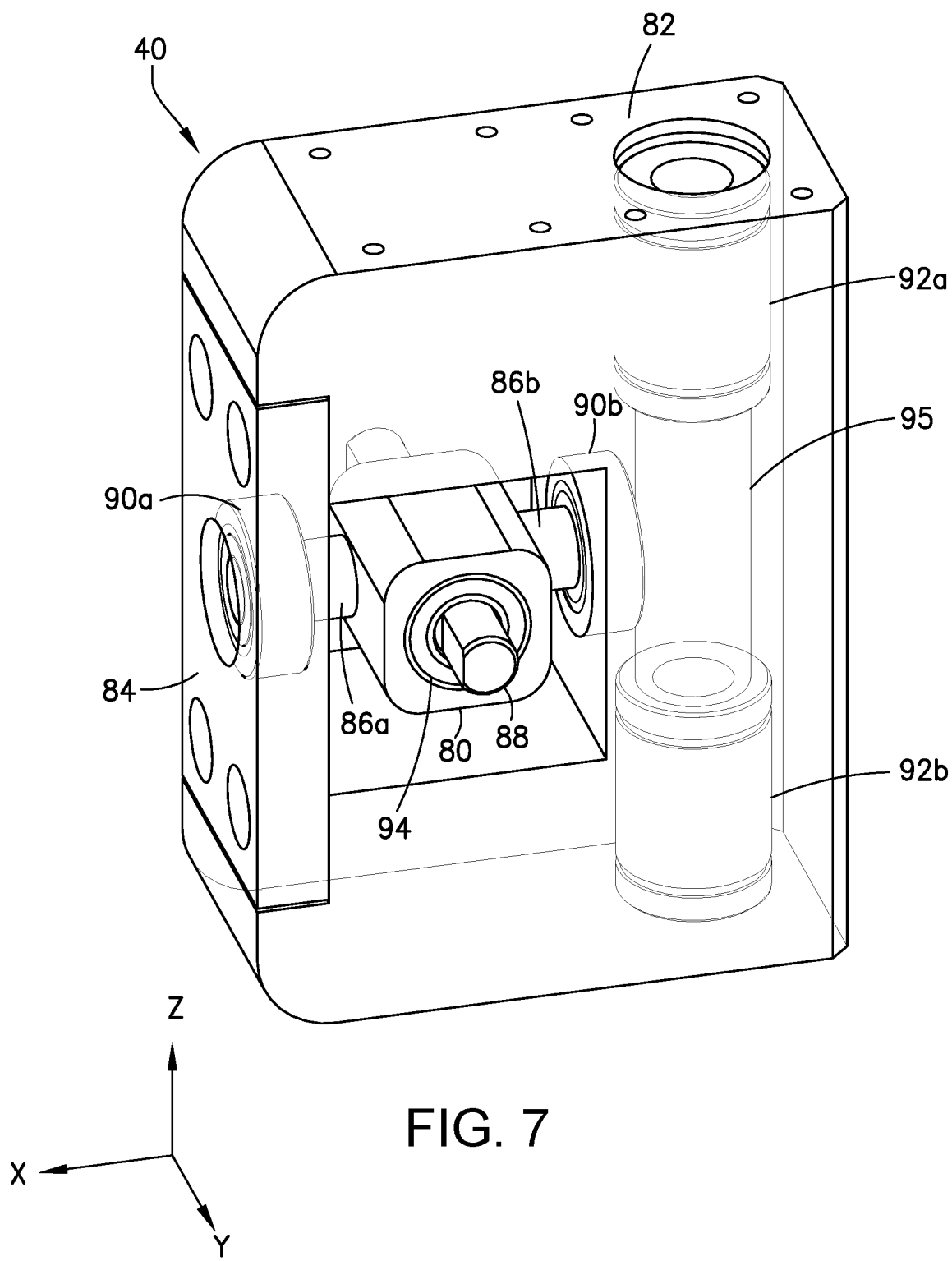
FIG. 7 is a diagram representing a three-dimensional view of a bearing block assembly in accordance with one embodiment. Six bearing block assemblies of the type depicted in FIG. 7 are incorporated in the NDI tool head depicted in FIG. 3.

FIG. 7 is a diagram representing a three-dimensional view of a bearing block assembly 40 in accordance with one embodiment. FIG. 7 also shows a rotatable shaft 88 which is supported by and not part of the bearing block assembly 40. Six bearing block assemblies 40*a*-40*f* of the type depicted in FIG. 7 are incorporated in the NDI tool head 10\* depicted in FIG. 3.

Figure 7A:
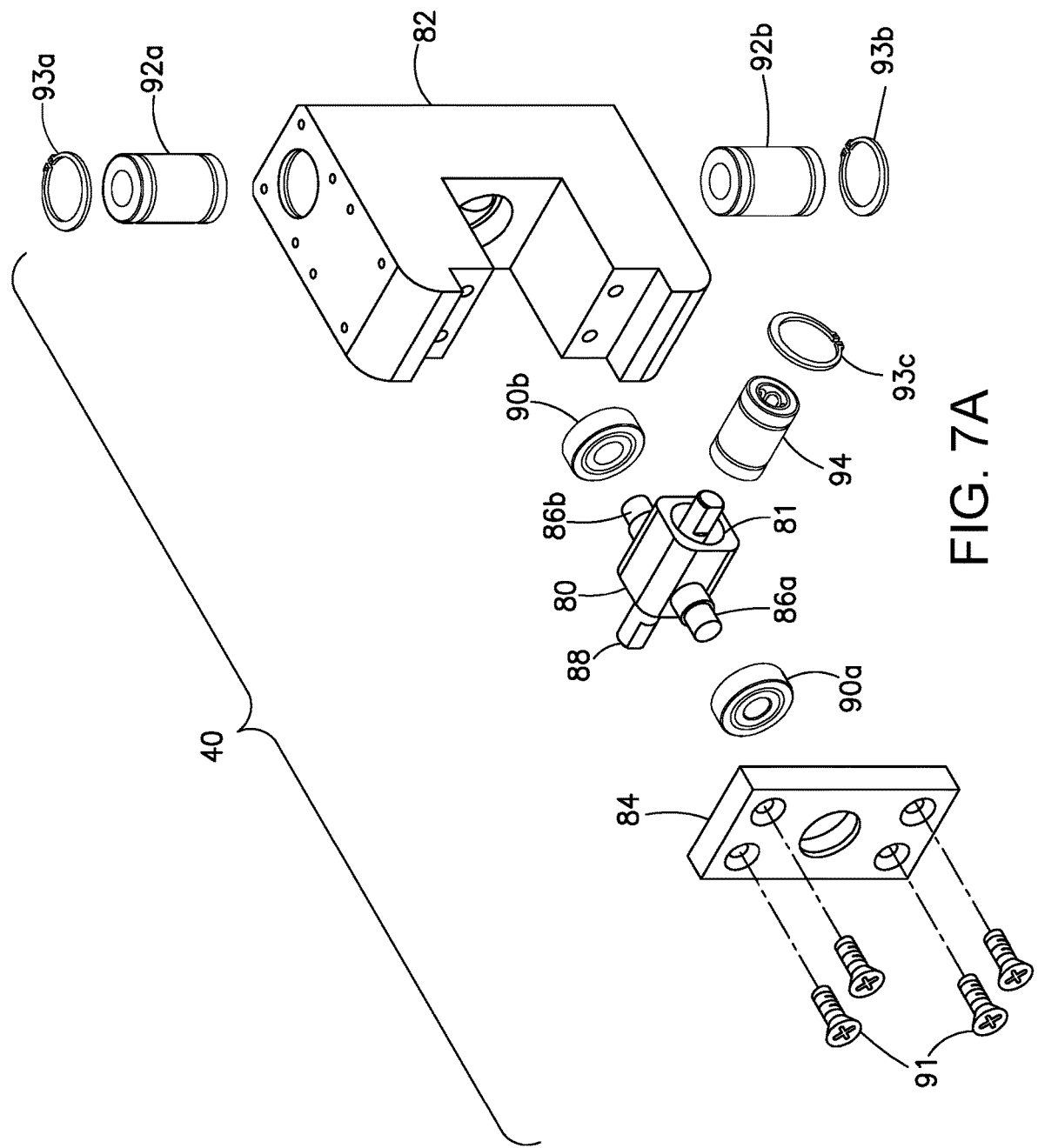
FIG. 7A is a diagram representing an exploded view of the bearing block assembly depicted in FIG. 7.

FIG. 7A is a diagram representing an exploded view of the bearing block assembly 40 depicted in FIG. 7. The bearing block assembly 40 includes a bearing block 82 and a bearing holder 84 which is fastened to bearing block 82 by flat-head screws 91 to form a housing. In one implementation, the bearing block 82 and bearing holder 84 are machined parts made of aluminum alloy. The bearing block 82 and bearing holder 84 support a pivot 80, which is also a machined part made of aluminum alloy. The bearing holder 84 holds a bearing 90*a* and the bearing block 82 holds a bearing 90*b*. As best seen in FIG. 7, the bearings 90*a* and 90*b* are aligned and support respective pivot pins 86*a* and 86*b* of pivot 80, which pivot pins 86*a* and 86*b* are coaxial and project in opposite directions. This arrangement enables the pivot 80 to rotate about a common axis of rotation of the pivot pins 86*a* and 86*b*. When the bearing block assembly 40 is installed in the NDI tool head 10\*, the axis of rotation of the pivot 80 is parallel to the X axis of the tool frame assembly 12\*.

Referring to FIG. 7, the bearing block assembly 40 further includes a linear ball bearing 94 that supports the rotatable shaft 88 inside the pivot 80. The rotatable shaft 88 is also translatable along the axis of the linear ball bearing 94. As best seen in FIG. 7A, the linear ball bearing 94 is placed inside a bore 81 formed in the pivot 80. The central axis of the bore 81 is oriented perpendicular to the common axis of rotation of the pivot pins 86*a* and 86*b*. The linear ball bearing 94 is retained inside the bore 81 of pivot 80 by means of a retaining ring 93*c*. When the bearing block assembly 40 is installed in the NDI tool head 10\*, the axis of the rotatable shaft 88 is perpendicular to the X axis of the tool frame assembly 12\*.

Referring again to FIG. 7, the bearing block assembly 40 further includes a pair of linear bearings 92*a* and 92*b* having a common axis which is perpendicular to the common axis of rotation of the pivot pins 86*a* and 86*b*. The linear bearings 92*a* and 92*b* are retained inside the bearing block 82 by means of respective retaining rings 93*a* and 93*b*. The linear bearings 92*a* and 92*b* are seated in respective circular cylindrical spaces inside the bearing block 82, which spaces are connected by a circular cylindrical bore 95. A guide shaft is passed through the linear bearings 92*a* and 92*b* and the bore 95. The linear bearings 92*a* and 92*b* translatably couple the bearing block assembly 40 to the guide shaft. (The linear bearings 92*a* and 92*b* also rotatably couple the bearing block assembly 40 to the guide shaft, but this degree of freedom is not utilized during blade stiffener inspection.) When the bearing block assembly 40 is installed in the NDI tool head 10\*, the common axis of linear bearings 92*a* and 92*b* is parallel to the Z axis of the tool frame assembly 12\*.

Thus, a pair of bearing block assemblies 40 of the type depicted in FIGS. 7 and 7A, when coupled to the rotatable shafts an NDI probe assembly, enables that NDI probe assembly to rotate and translate as necessary to adjust to the changing cross-sectional profile of a blade stiffener as the NDI probe assembly travels in a lengthwise direction along the blade stiffener. In the embodiment depicted in FIG. 3, each of the flange, radius and web NDI probe assemblies 32, 34 and 36 are able to adjust their respective positions and orientations independently.

Figure 8:
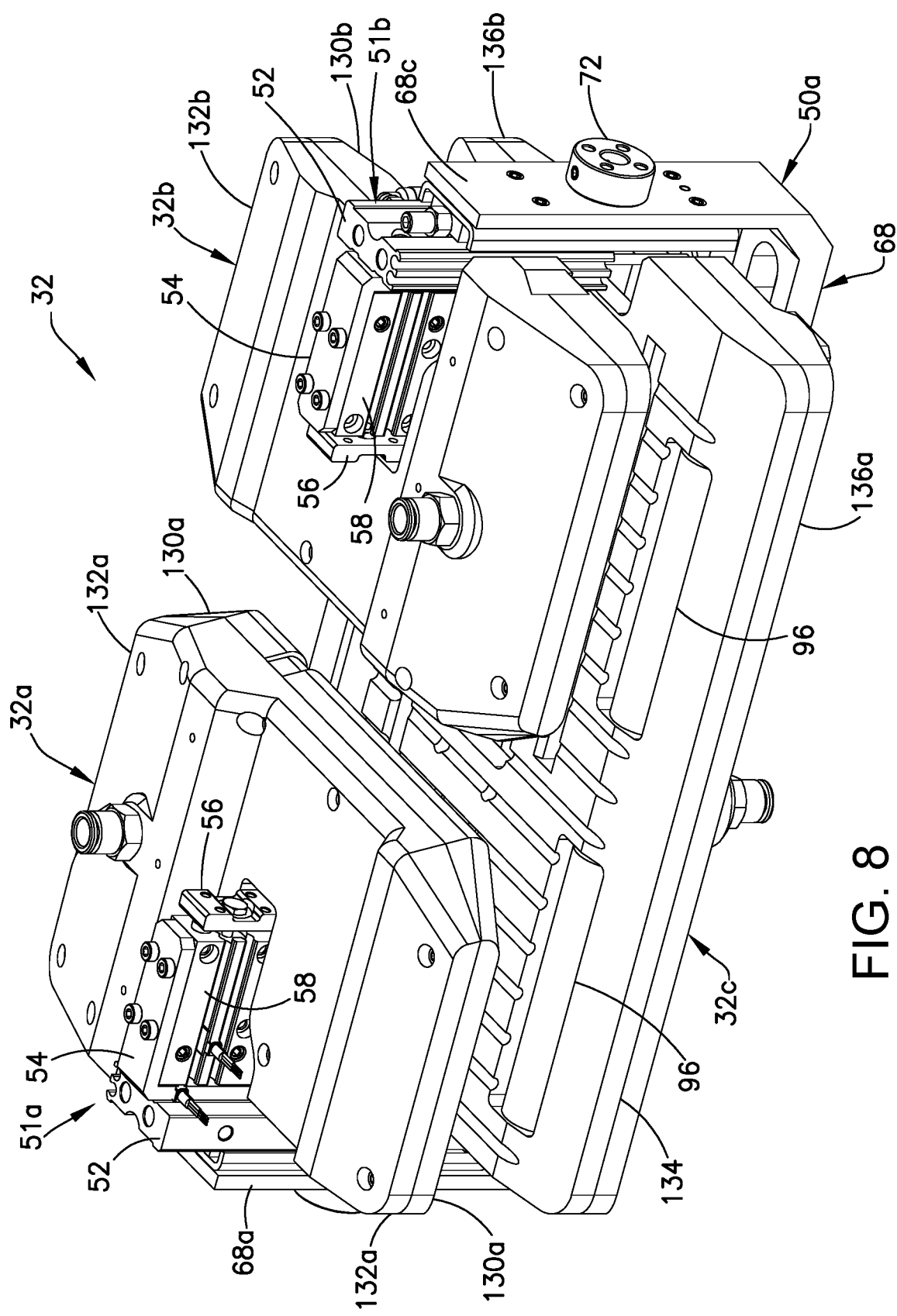
FIG. 8 is a diagram representing a three-dimensional view of a flange NDI probe assembly in accordance with one embodiment, which flange NDI probe assembly is incorporated in the NDI tool head depicted in FIG. 3.

FIG. 8 is a diagram representing a three-dimensional view of a flange NDI probe assembly 32 in accordance with one embodiment, which flange NDI probe assembly 32 is incorporated in the NDI tool head 10\* depicted in FIG. 3. The flange NDI probe assembly 32 includes a left upper subassembly 32*a* that is attached to the linear pneumatic slide table 56 of a linear pneumatic slide assembly 51*a* of the probe frame assembly 50*a*, a right upper subassembly 32*b* that is attached to the linear pneumatic slide table 56 of a linear pneumatic slide assembly 51*b* of the probe frame assembly 50*a*, and a lower assembly 32*c* that is attached to the lower frame bracket 68 of the probe frame assembly 50*a*.

As seen in FIG. 8, the left upper subassembly 32*a* of flange NDI probe assembly 32 includes a left upper wear plate 130*a* and a left upper roller cover 132*a* and the right upper subassembly 32*b* of flange NDI probe assembly 32 includes a right upper wear plate 130*b* and a right upper roller cover 132*b*. The lower assembly 32*c* of flange NDI probe assembly 32 includes a lower wear plate 134 and front and rear array housings 136a and 136b which house respective linear ultrasonic transducer arrays (not visible in FIG. 8).

Figure 9:
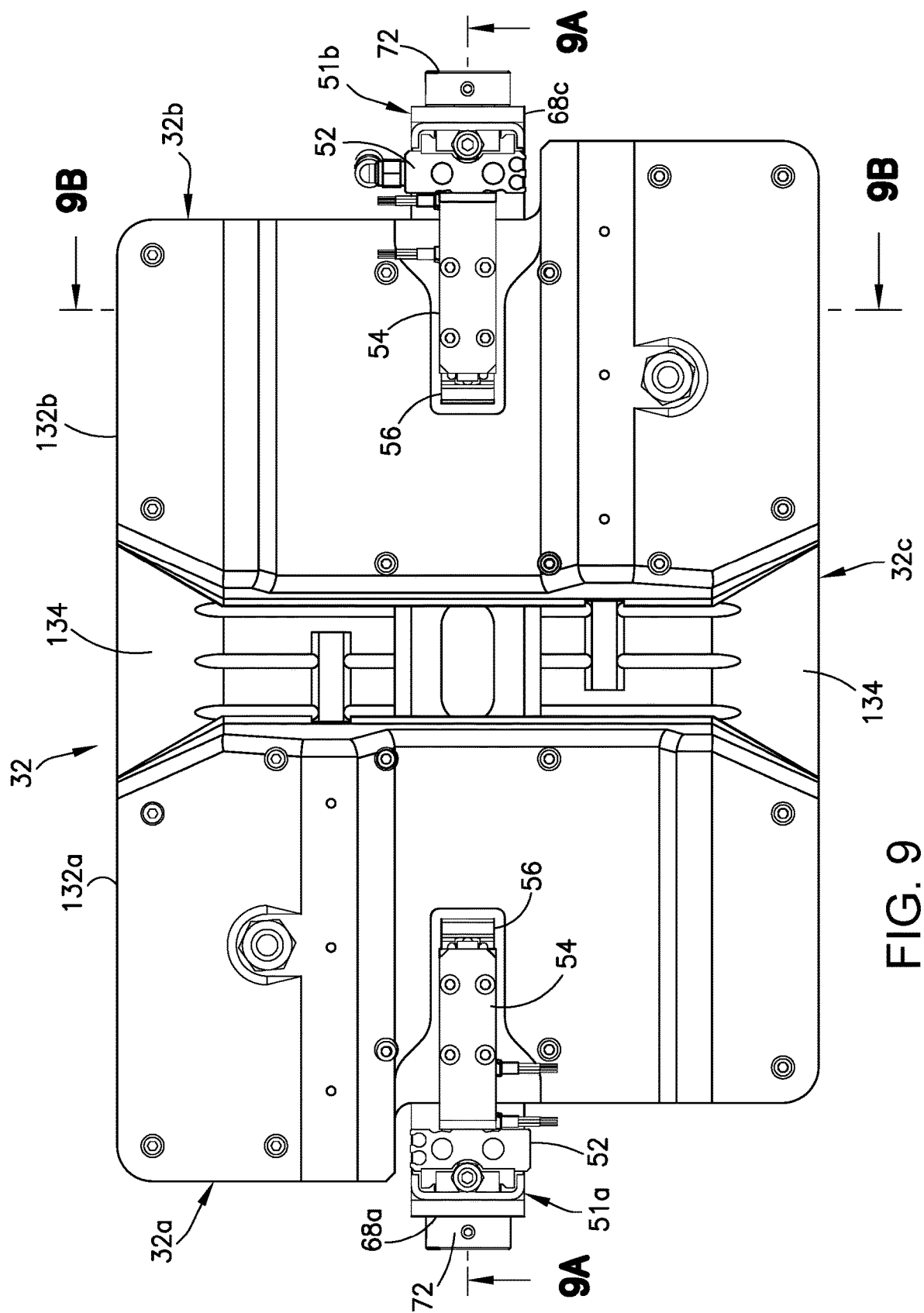
FIG. 9 is a diagram representing a top view of the flange NDI probe assembly depicted in FIG. 8.
Figure 9A:
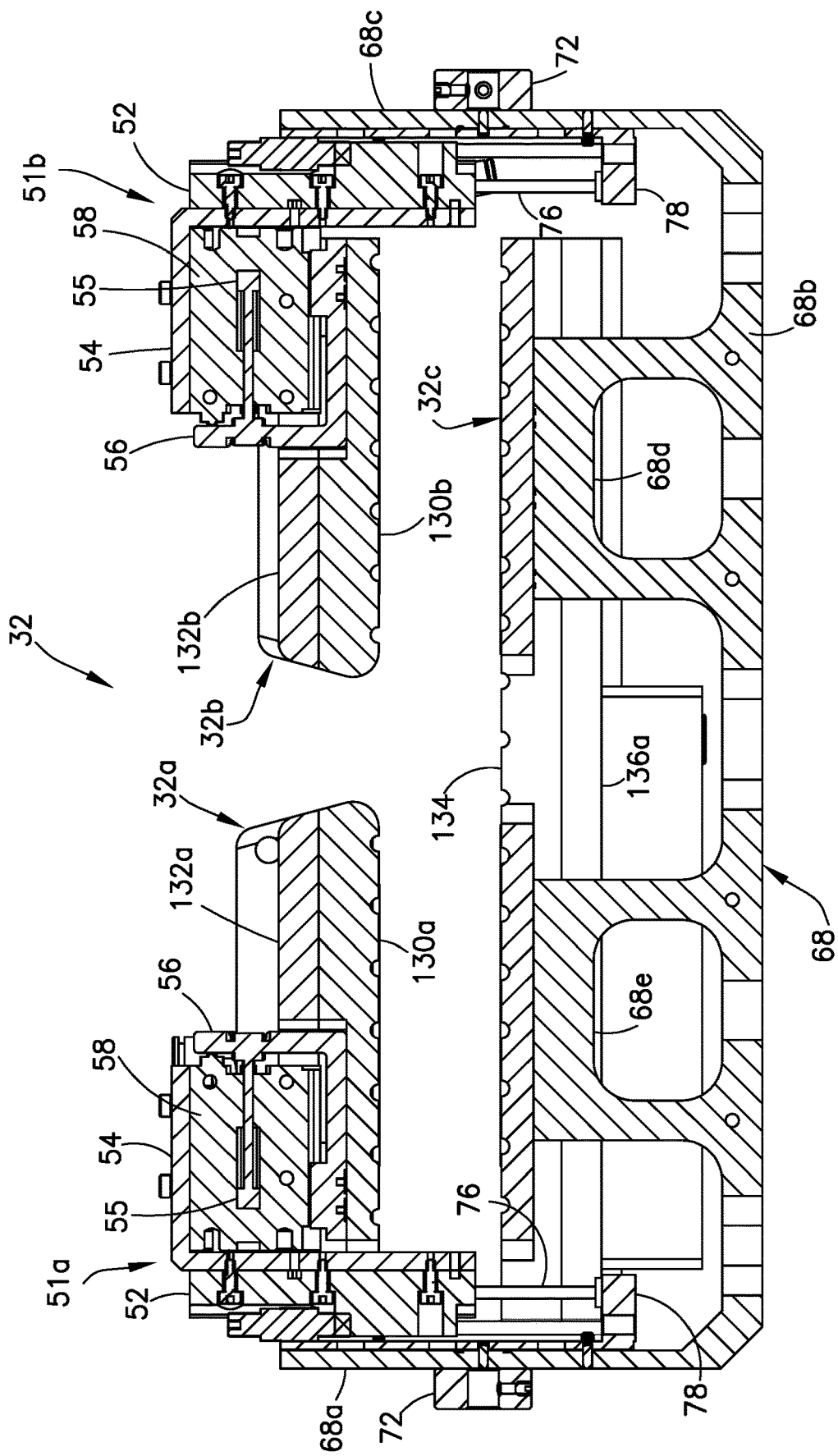
FIG. 9A is a diagram representing a sectional view of the flange NDI probe assembly depicted in FIG. 8, the sectional view being taken along line 9A-9A seen in FIG. 9.
Figure 9B:
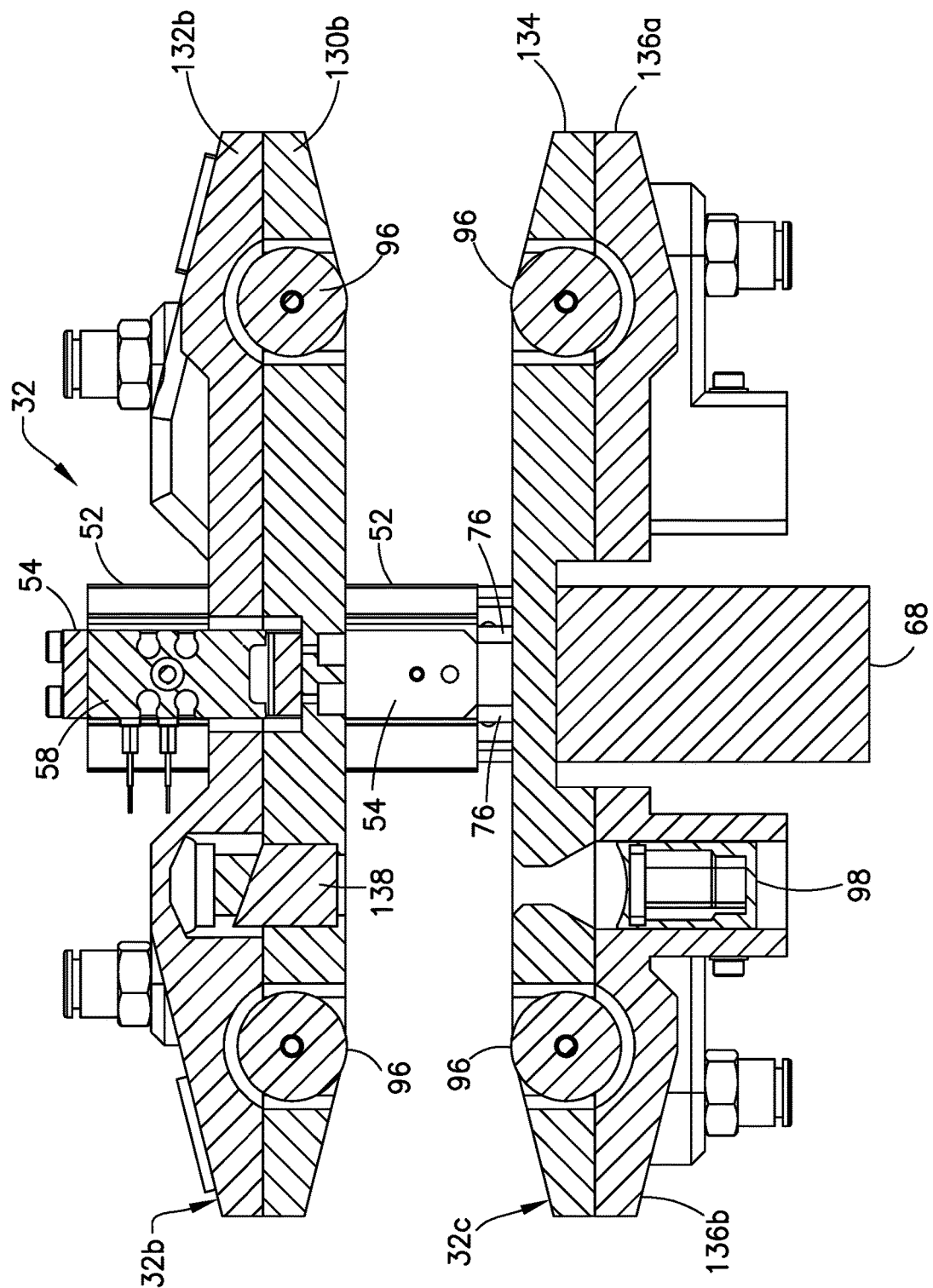
FIG. 9B is a diagram representing a sectional view of the flange NDI probe assembly depicted in FIG. 8, the sectional view being taken along line 9B-9B seen in FIG. 9.

FIG. 9 is a diagram representing a top view of the flange NDI probe assembly 32 depicted in FIG. 8. FIG. 9A is a diagram representing a sectional view of the flange NDI probe assembly 32 depicted in FIG. 8, the sectional view being taken along line 9A-9A seen in FIG. 9. FIG. 9B is a diagram representing a sectional view of the flange NDI probe assembly 32 depicted in FIG. 8, the sectional view being taken along line 9B-9B seen in FIG. 9. As seen in FIG. 9A, the flange NDI probe assembly 32 further includes a pair of shaft collars 72 which are clamped to respective rotatable shafts that are supported by respective bearing block assemblies, as described above. In addition, FIG. 9A also shows that the linear pneumatic slide tables 56 comprise respective pistons 55 which slide inside respective cylinders 58 of the linear pneumatic slide assemblies 51a and 51b.

Each of the left and right upper subassemblies 32a and 32b of flange NDI probe assembly 32 further includes a respective pair of rollers 96, one pair of which is shown in section in FIG. 9B. In addition, the lower assembly 32c of flange NDI probe assembly 32 includes four rollers 96, two of which is shown in section in FIG. 9B. The rollers 96 contact the upper and lowers surfaces of the flange of a blade stiffener and enable the flange NDI probe assembly 32 to roll along the flange during an inspection operation while inspecting the flange from the bottom. As shown in FIG. 9B, the front array housing 136a houses a linear ultrasonic transducer array 98 which is acoustically coupled to the blade stiffener flange. As the flange NDI probe assembly 32 rolls along the blade stiffener, the linear ultrasonic transducer array 98 emits ultrasonic waves that travel through the blade stiffener flange and detects returning echoes.

In addition, the right upper wear plate 130b of flange NDI probe assembly 32 houses a linear block 138 of dry acoustic couplant elastomeric material which is vertically aligned with the linear ultrasonic transducer array 98. A similar arrangement exists on the left-hand side of the flange NDI probe assembly 32. During an inspection procedure, the linear ultrasonic transducer array 98 is acoustically coupled by water to the bottom surface of the blade stiffener flange. In addition, the upper surface of the blade stiffener flange is in contact with the linear block 138 of dry acoustic couplant elastomeric material. The dry acoustic couplant elastomeric material (e.g., Aqualene Rubber commercially available from Innovation Polymers, Kitchener, Ontario, Canada) has an acoustic velocity and an acoustic impedance nearly the same as water. The linear block 138 of dry acoustic couplant elastomeric material (which mimics the effect of water on ultrasound waves) acts as a delay line by enabling ultrasound waves to pass through. The system detects reflections from the upper surface of the blade stiffener flange during pulse echo inspection. The impedance mismatch of the composite material relative to the water creates this reflection. The dry acoustic couplant elastomeric material serves to mimic the impedance of water so the reflection from the upper surface of the blade stiffener flange looks the same as if water were on the back side of the flange.

Figure 10:
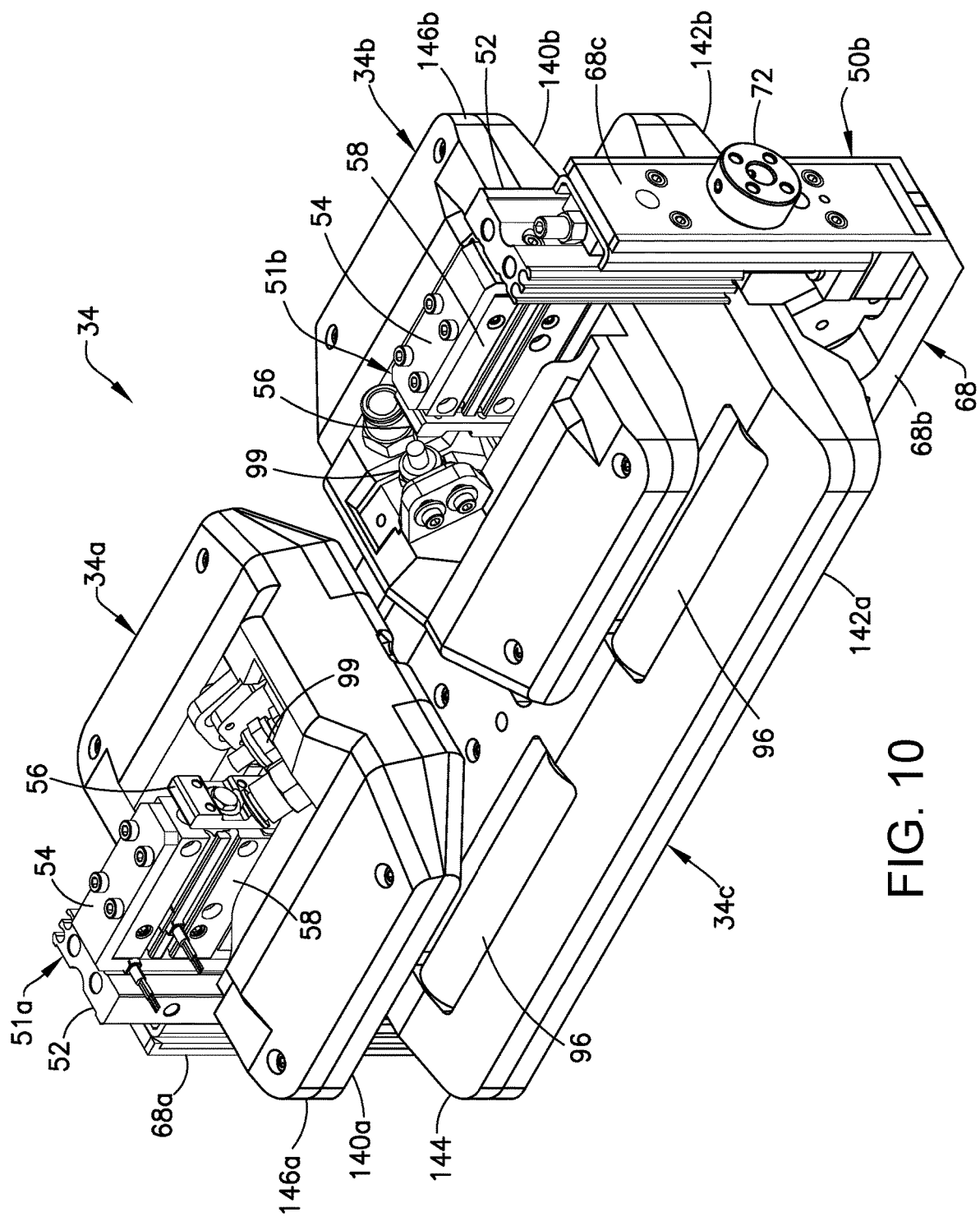
FIG. 10 is a diagram representing a three-dimensional view of a radius NDI probe assembly in accordance with one embodiment, which radius NDI probe assembly is incorporated in the NDI tool head depicted in FIG. 3.

FIG. 10 is a diagram representing a three-dimensional view of a radius NDI probe assembly 34 in accordance with one embodiment, which radius NDI probe assembly 32 is incorporated in the NDI tool head 10* depicted in FIG. 3. The radius NDI probe assembly 34 includes a left upper subassembly 34a that is attached to the linear pneumatic slide table 56 of a linear pneumatic slide assembly 51a of the probe frame assembly 50b, a right upper subassembly 34b that is attached to the linear pneumatic slide table 56 of a linear pneumatic slide assembly 51b of the probe frame assembly 50b, and a lower assembly 34c that is attached to the lower frame bracket 68 of the probe frame assembly 50b.

As seen in FIG. 10, the left upper subassembly 34a of radius NDI probe assembly 34 includes a left upper wear plate 140a and a left array housing 146a and the right upper subassembly 34b of radius NDI probe assembly 34 includes a right upper wear plate 140b and a right array housing 146b. The left and right array housings 146a and 146b house respective curved ultrasonic transducer arrays 99 for respectively scanning the left and right radiused portions of a blade stiffener. The lower assembly 34c of radius NDI probe assembly 34 includes a lower wear plate 144 and front and rear lower roller covers 142a, 142b. The previously described linear pneumatic slide assemblies 51a and 51b press the curved ultrasonic transducer arrays 99 against the respective radiused portions. The curved ultrasonic transducer arrays 99 can be operated in a pulse echo mode to ultrasonically inspect the left and right radiused portions of the blade stiffener. Water is provided inside the left and right array housings 146a and 146b by way of respective water fittings.

Figure 11:
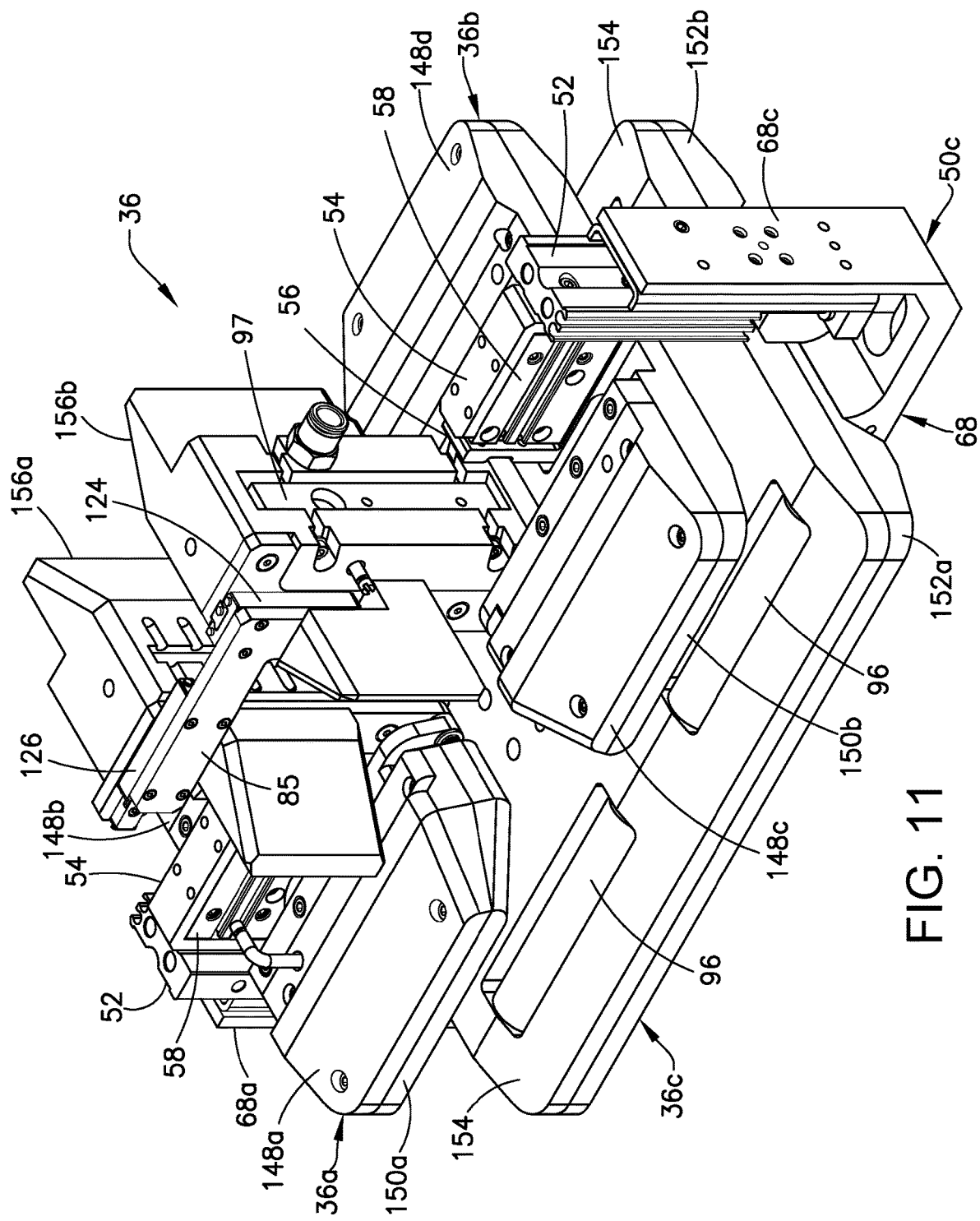
FIG. 11 is a diagram representing a three-dimensional view of a web NDI probe assembly in accordance with one embodiment, which web NDI probe assembly is incorporated in the NDI tool head depicted in FIG. 3.

FIG. 11 is a diagram representing a three-dimensional view of a web NDI probe assembly 36 in accordance with one embodiment, which web NDI probe assembly 36 is incorporated in the NDI tool head 10* depicted in FIG. 3. The web NDI probe assembly 36 includes a left upper subassembly 36a that is attached to the linear pneumatic slide table 56 of a linear pneumatic slide assembly 51a of the probe frame assembly 50c, a right upper subassembly 36b that is attached to the linear pneumatic slide table 56 of a linear pneumatic slide assembly 51b of the probe frame assembly 50c, and a lower assembly 36c that is attached to the lower frame bracket 68 of the probe frame assembly 50c. The left upper subassembly 36a is coupled to the right upper subassembly 36b by means of an L-shaped bracket 85 which is attached to a pair of mutually orthogonal linear slides 124 and 126.

As seen in FIG. 11, the left upper subassembly 36a of web NDI probe assembly 36 includes a left upper wear plate 150a and a left pair of upper roller covers 148a and 148b and the right upper subassembly 36b of web NDI probe assembly 34 includes a right upper wear plate 150b and a right pair of upper roller covers 148c and 148d. In addition, the left upper subassembly 36a of web NDI probe assembly 36 further includes a left array housing 156a; the right upper subassembly 36b of web NDI probe assembly 36 further includes a right array housing 156b. The left array housing 156a is coupled to the right array housing 156b by means of the L-shaped bracket 85 and linear slides 124 and 126. The left and right array housings 156a and 145b house respective linear ultrasonic transducer arrays 97 (only one of which is visible in FIG. 11) for respectively scanning the left and right sides of the web of a blade stiffener.

Still referring to FIG. 11, the lower assembly 36c of web NDI probe assembly 36 includes a lower wear plate 154 and front and rear lower roller covers 152a and 152b. The linear ultrasonic transducer arrays 97 can be operated in a pulse echo mode to ultrasonically inspect the left and right sides of a blade stiffener web. Water is provided inside the left and right array housings 156a and 156b by way of respective water fittings.

In accordance with one embodiment, the left and right array housings 156a and 156b are respectively rotatably coupled to the left and right upper wear plates 150a and 150b. In addition, the left and right array housings 156a and 156*b* are indirectly translatably coupled to each other by means of the L-shaped bracket 85 comprising two legs that form a right angle. The left array housing 156*a* is translatably coupled to the horizontal leg of L-shaped bracket 85 by means of linear slide 126 to enable horizontal translation; the right array housing 156*b* is translatably coupled to the vertical leg of L-shaped bracket 85 by means of linear slide 124 to enable vertical translation.

Figure 11A:
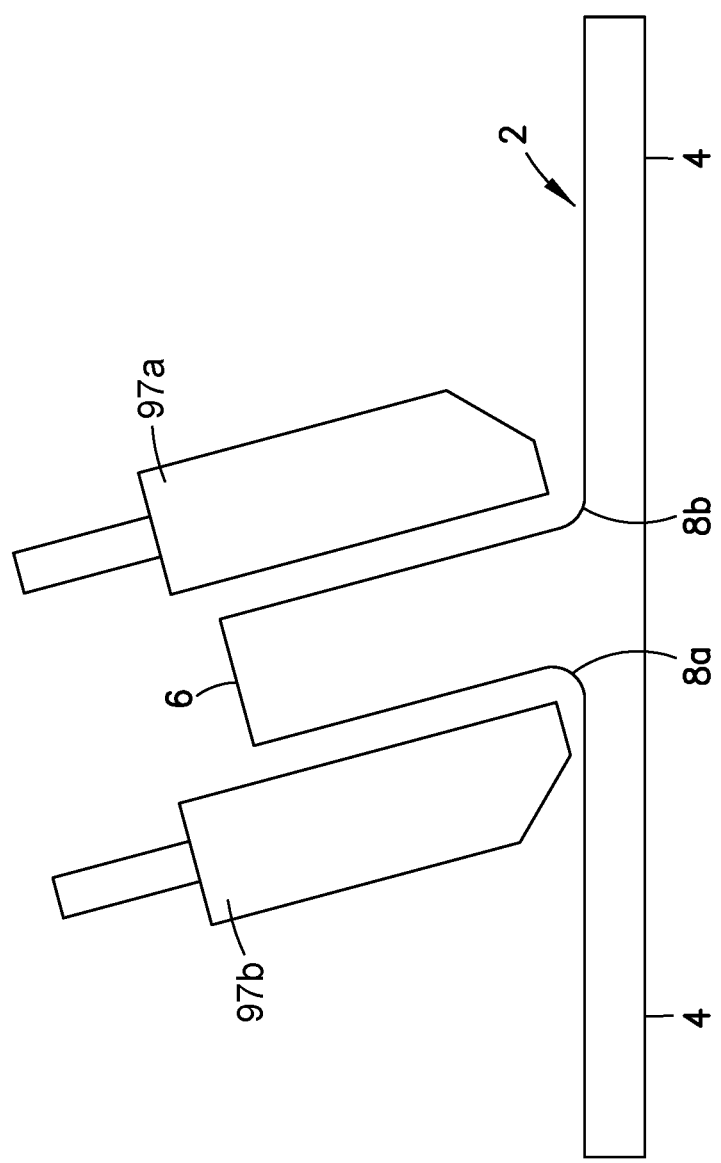
FIG. 11A is a diagram representing an elevational view of a pair of linear ultrasonic transducer arrays disposed on opposite sides of a web of a blade stiffener.

FIG. 11A is a diagram representing an elevational view of a pair of linear ultrasonic transducer arrays 97*a* and 97*b* disposed on opposite sides of a blade stiffener web 6 which is not perpendicular to the blade stiffener flange 4. The left and right array housings 156*a* and 156*b* can rotate to adjust to a changing web-flange angle of the blade stiffener 2. This angle changes along the length of the part. The web probes follow the changing web-flange angle. More specifically, the left and right array housings 156*a* and 156*b* rotate in tandem by the same angle about first and second axes of respective pairs of pivot joints (not visible in FIG. 11) which rotatably couple the left and right array housings 156*a* and 156*b* to the left and right upper wear plates 150*a* and 150*b*. The pivot points may take the form of revolute joints.

As seen in FIG. 11, the linear ultrasonic transducer arrays 97*a* and 97*b* stay in mutually parallel relationship despite rotation of the left and right array housings 156*a* and 156*b*. In addition, the width of the gap between the mutually parallel linear ultrasonic transducer arrays 97*a* and 97*b* will adjust to the varying thickness of the blade stiffener web 6 due to the ability of the left and right upper wear plates 150*a* and 150*b* to translate horizontally toward or away from each other. Furthermore, in cases where the blade stiffener 2 has a constant thickness but a non-zero curvature in a horizontal plane, the left and right upper wear plates 150*a* and 150*b* can translate horizontally in the same direction to compensate for that web curvature.

The linear ultrasonic transducer arrays 97*a* and 97*b* can be operated in a pulse echo mode to ultrasonically inspect the left and right sides of web 6 of a blade stiffener 2. During scanning, the L-shaped bracket 85 (in conjunction with linear slides 124 and 126 depicted in FIG. 11) allows the linear ultrasonic transducer arrays 97*a* and 97*b* to move up and down (parallel to the blade stiffener web 6) independently and move side to side (parallel to the blade stiffener flange 4) independently. As the left and right array housings 156*a* and 156*b* (see FIG. 11) rotate in tandem and/or move up/down and/or move closer together/further apart, the L-shaped bracket 85 maintains the parallelism of the linear ultrasonic transducer arrays 97*a* and 97*b*.

The NDI tool head 10* described in detail above may be adapted for coupling to a robotic arm or a gantry robot. A gantry robot consists of a manipulator mounted onto an overhead system that allows movement across a horizontal plane. Gantry robots are also called Cartesian or linear robots. The robotic arm may be part of a robot having multi-axis movement capabilities.

Figure 12:
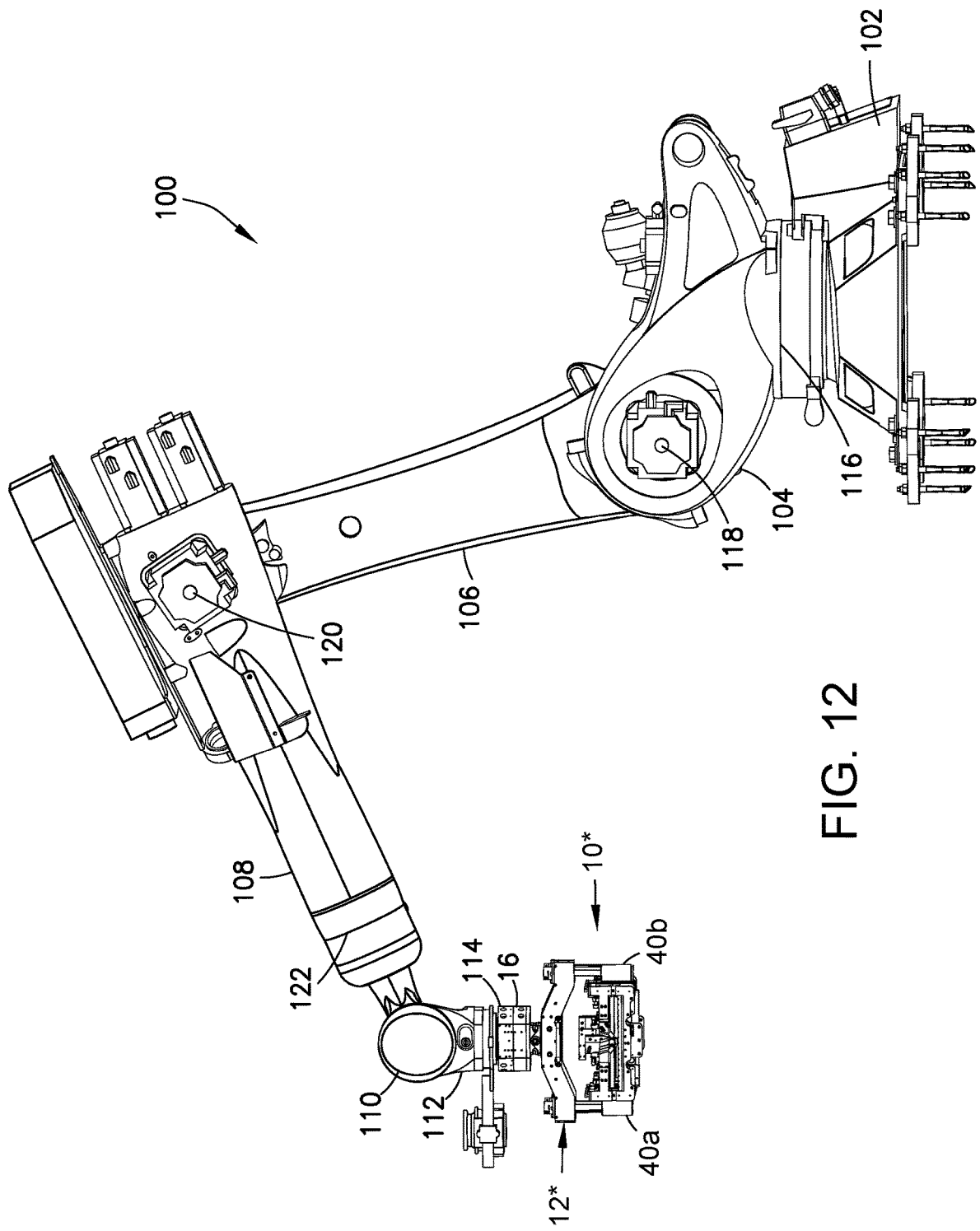
FIG. 12 is a diagram representing an elevational view of the NDI tool head depicted in FIG. 3 mounted to a robot.

FIG. 12 shows an automated system for inspecting an elongated composite member such as a blade stiffener in which the NDI tool head 10* is mounted to a robot 100. Although not shown in FIG. 12, the ultrasonic probes incorporated in the NDI tool head 10* will be electrically connected to a data acquisition system (also not shown in FIG. 12) by means of electrical cables (not shown in FIG. 12) and will be in fluid communication with a source of liquid acoustic couplant (e.g., water) by means of hoses.

The NDI tool head 10* is attached to the robot 100 by attaching the tool-side connector plate 16 to a connector plate 114 of the robot 100. As the NDI tool head 10* is moved along the elongated composite member being inspected, data is sent to the data acquisition system for processing. Typically, the robot 100 is automatically controlled to move the NDI tool head 10* in a lengthwise direction along the elongated composite member, while the data acquisition system generates images of the elongated composite member to map the NDI probe responses. The robot 100 could be used to inspect any number of elongated composite members in a variety of industries where detection of flaws or defects in the structure is required, such as in the aircraft, automotive, or construction industries. In particular, if the NDI tool head 10* is of the type shown in FIG. 3, the robot 100 could be used to inspect stiffeners of the type shown in FIGS. 1 and 2.

The robot 100 has multi-axis movement capabilities and uses software support to generate a three-dimensional profile to be used for measurement and inspection of parts. In particular, the robot 100 shown in FIG. 12 comprises a robot base 102, a carousel 104, a rocker 106 (a.k.a. pivot arm), an extension arm 108, a robot hand 110, and a member 112 to which the connector plate 114 is attached. The robot base 102 and carousel 104 are rotatably coupled by a rotational joint 116. The carousel 104 and rocker 106 are rotatably coupled by a pivot joint 118. The rocker 106 and extension arm 108 are rotatably coupled by a pivot joint 120. The rocker extension arm 108 and robot hand 110 are rotatably coupled by a rotational joint 122. The combination of these components provides multiple degrees of freedom, which in turn allows the NDI tool head 10* to be moved to different locations and in different directions. The robot 100 may include one or more positional sensors (not shown) at, or otherwise associated with, each of the pivot joints that provide positional data (X, Y, and Z in three-dimensional space) to the data acquisition system for accurately locating the probes. In addition, the NDI tool head 10* could include various numbers of sensors (e.g., one or more) for acquiring positional data. The probes provide ultrasonic data indicative of the structure being inspected. As such, the robot 100 provides an accurate location of any defects using positional data and ultrasonic data acquired during inspection of an elongated composite member. An example of a robot 100 that could be employed with the NDI tool head 10* shown in FIG. 3 is robot Model KR-150 manufactured by Kuka Roboter GmbH (Augsburg, Germany), although any robot or other manipulator capable of carrying an ultrasonic inspection tool head and communicating with a data acquisition system could be used.

The data acquisition system may be capable of generating various images, including A-scan, B-scan, and C-scan images of elongated composite members based on data collected by the positional sensors and ultrasonic probes. Furthermore, the data acquisition system may be capable of generating a three-dimensional point cloud based on the data acquired by the positional sensors and the ultrasonic probes. Thus, a stream of positional data may be mapped to a stream of ultrasonic data to generate the point cloud. The ultrasonic data may include, among other information, data regarding anomalies, defects, irregularities, or other imperfections in the inspected structure. The data acquisition system typically includes a processor or similar computing device operating under the control of imaging software so that any defects in the inspected structure may be presented on a display screen. The processor could be embodied by a computer such as a desktop, laptop, or portable processing device capable of processing the data generated by the positional sensors and ultrasonic probes and creating an image of the scanned data that is shown on a display such as a monitor or other viewing device. The data acquisition system may generate images of the data and also allow a user to store and edit previously created images. Therefore, a permanent record of the images may be kept for future use or record keeping. However, it is understood that the data acquisition system need not generate images, as the data acquisition system could mathematically collect and analyze positional and ultrasonic data that a technician could use to characterize and locate a flaw based on the data.

The robot 100 is typically in communication with the data acquisition system to process the data acquired by the positional sensors and ultrasonic probes and to display the processed data. In many cases, communications cable(s) (not shown in FIG. 12) transmit data between the robot 100 and the data acquisition system. In other embodiments, the data may be transmitted between the robot 100 and the data acquisition system via wireless communications. The robot 100 may be directly connected to the processor, or indirectly connected, such as via a network. In further embodiments, the data acquisition system may be located proximate to the robot 100, such that remote connections between the robot and data acquisition system are not necessary.

While methods and apparatus for automated inspection of elongated composite members have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used in the claims, the term "computer system" comprises a single processing or computing device or multiple processing or computing devices that communicate via wireline or wireless connections. Such processing or computing devices typically include one or more of the following: a processor, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatively unless the claim language explicitly states a condition that precludes such an interpretation.

The invention claimed is:

1. An apparatus comprising:
   a tool frame assembly comprising first and second guide shafts oriented parallel to a Z axis of the tool frame assembly;
   first and second bearing block assemblies slidably coupled to the first and second guide shafts respectively and comprising first and second pivots respectively, the first and second pivots being rotatable about first and second axes of rotation which are parallel to an X axis perpendicular to the Z axis; and
   a first frame assembly comprising first and second rotatable shafts which are coaxial with a third axis of rotation perpendicular to the X axis, the first and second rotatable shafts being rotatably and translatably coupled to the first and second pivots respectively for rotation about and translation along the third axis of rotation.

2. The apparatus as recited in claim 1, wherein the first pivot comprises first and second pivot pins which are coaxial and the first bearing block assembly further comprises:
   a linear ball bearing disposed between the first rotatable shaft and the first pivot;
   first and second bearings that support the first and second pivot pins respectively of the first pivot; and
   first and second linear bearings which are slidably coupled to the first guide shaft.

3. The apparatus as recited in claim 1, wherein the first frame assembly comprises a lower frame bracket and first and second linear slide tables which are translatable relative to the lower frame bracket along first and second linear paths which are mutually parallel.

4. The apparatus as recited in claim 3, wherein the first frame assembly further comprises third and fourth linear slide tables which are respectively translatable relative to the first and second linear slide tables along a third linear path which is perpendicular to the first and second linear paths.

5. The apparatus as recited in claim 4, further comprising an upper assembly attached to the third and fourth linear slide tables and a lower assembly attached to the lower frame bracket, wherein the upper assembly comprises first and second non-destructive inspection probes which are translatable relative to each other and rotatable in tandem.

6. The apparatus as recited in claim 4, further comprising a first upper subassembly attached to the third linear slide table, a second upper subassembly attached to the fourth linear slide table, and a lower assembly attached to the lower frame bracket, wherein the first upper subassembly comprises a first non-destructive inspection (NDI) probe and the second upper subassembly comprises a second NDI probe, the first and second NDI probes being translatable relative to each other and rotatable in tandem.

7. The apparatus as recited in claim 4, further comprising a first upper subassembly attached to the third linear slide table, a second upper subassembly attached to the fourth linear slide table, and a lower assembly attached to the lower frame bracket, wherein the lower assembly comprises first and second non-destructive inspection probes.

8. The apparatus as recited in claim 1, wherein the tool frame assembly further comprises third and fourth guide shafts oriented parallel to the Z axis of the tool frame assembly, a first lower guide shaft spacer which maintains a spacing between the first and third guide shafts, and a second lower guide shaft spacer which maintains a spacing between the second and fourth guide shafts, and wherein the apparatus further comprises:
   third and fourth bearing block assemblies slidably coupled to the third and fourth guide shafts respectively and comprising third and fourth pivots respectively, the third and fourth pivots being rotatable about fourth and fifth axes of rotation which are parallel to the X axis; and a second frame assembly comprising third and fourth rotatable shafts which are coaxial with a sixth axis of rotation perpendicular to the X axis, the third and fourth rotatable shafts being rotatably and translatably coupled to the third and fourth pivots respectively for rotation about and translation along the sixth axis of rotation.

9. The apparatus as recited in claim 8, wherein the tool frame assembly further comprises fifth and sixth guide shafts oriented parallel to the Z axis of the tool frame assembly, the first lower guide shaft spacer maintains a spacing between the third and fifth guide shafts, and the second lower guide shaft spacer maintains a spacing between the fourth and sixth guide shafts, and wherein the apparatus further comprises:

fifth and sixth bearing block assemblies slidably coupled to the fifth and sixth guide shafts respectively and comprising fifth and sixth pivots respectively, the fifth and sixth pivots being rotatable about seventh and eighth axes of rotation which are parallel to the X axis; and a third frame assembly comprising fifth and sixth rotatable shafts which are coaxial with a ninth axis of rotation perpendicular to the X axis, the fifth and sixth rotatable shafts being rotatably and translatably coupled to the fifth and sixth pivots respectively for rotation about and translation along the ninth axis of rotation.

10. The apparatus as recited in claim 1, further comprising first and second non-destructive inspection (NDI) probes supported by the first frame assembly.

11. The apparatus as recited in claim 10, wherein the first and second NDI probes are respective ultrasonic transducer arrays.

12. The apparatus as recited in claim 10, wherein the first frame assembly comprises:

a lower frame bracket;

first and second linear slide tables which are translatable relative to the lower frame bracket along first and second linear paths which are mutually parallel; and third and fourth linear slide tables which are respectively translatable relative to the first and second linear slide tables along a third linear path which is perpendicular to the first and second linear paths, and wherein the first NDI probe is coupled to the third linear slide table and the second NDI probe is coupled to the fourth linear slide table.

13. An apparatus for non-destructive inspection (NDI) of a blade stiffener, the apparatus comprising:

a tool frame assembly comprising first through sixth guide shafts oriented parallel to a Z axis of the tool frame assembly;

first through sixth bearing block assemblies slidably coupled to the first through sixth guide shafts respectively, wherein the first through sixth bearing block assemblies comprise respective pivots which are rotatable about respective axes of rotation which are parallel to an X axis, wherein the X axis is perpendicular to the Z axis;

a first NDI probe assembly comprising a first probe frame assembly and first and second NDI probes arranged for inspecting respective portions of a flange disposed on opposite sides of a web of a blade stiffener, wherein the first probe frame assembly comprises first and second rotatable shafts which are coaxial with a first axis of rotation perpendicular to the X axis, the first and second rotatable shafts being rotatably and translatably coupled to the respective pivots of the first and second bearing block assemblies for rotation about and translation along the first axis of rotation;

a second NDI probe assembly comprising a second probe frame assembly and third and fourth NDI probes arranged for inspecting respective radiused portions of the blade stiffener which connect the web to the flange, wherein the second probe frame assembly comprises third and fourth rotatable shafts which are coaxial with a second axis of rotation perpendicular to the X axis, the third and fourth rotatable shafts being rotatably and translatably coupled to the respective pivots of the third and fourth bearing block assemblies for rotation about and translation along the second axis of rotation; and a third NDI probe assembly comprising a third probe frame assembly and fifth and sixth NDI probes arranged for inspecting the web of the blade stiffener, wherein the third probe frame assembly comprises fifth and sixth rotatable shafts which are coaxial with a third axis of rotation perpendicular to the X axis, the fifth and sixth rotatable shafts being rotatably and translatably coupled to the respective pivots of the fifth and sixth bearing block assemblies for rotation about and translation along the third axis of rotation.

14. The apparatus as recited in claim 13, wherein each of the first through third probe frame assemblies comprises a lower frame bracket and first and second linear slide tables which are respectively translatable relative to the lower frame bracket along first and second linear paths which are mutually parallel.

15. The apparatus as recited in claim 14, wherein each of the first through third probe frame assemblies further comprises third and fourth linear slide tables which are respectively translatable relative to the first and second linear slide tables along a third linear path which is perpendicular to the first and second linear paths.

16. The apparatus as recited in claim 15, wherein:

the first and second NDI probes are respectively coupled to the third and fourth linear slide tables of the first probe frame assembly;

the third and fourth NDI probes are respectively coupled to the third and fourth linear slide tables of the second probe frame assembly; and the fifth and sixth NDI probes are respectively coupled to the third and fourth linear slide tables of the third probe frame assembly.

17. The apparatus as recited in claim 13, wherein each pivot of the first through sixth bearing block assemblies comprises first and second pivot pins which are coaxial, and wherein each of the first through sixth bearing block assemblies further comprises:

a linear ball bearing disposed between a respective one of the first through sixth rotatable shafts and the respective pivot;

first and second bearings that support the first and second pivot pins respectively of the respective pivot; and first and second linear bearings which are slidably coupled to a respective guide shaft of the first through sixth guide shafts.

18. The apparatus as recited in claim 13, wherein the first through sixth NDI probes are respective ultrasonic transducer arrays.

19. An apparatus for non-destructive inspection (NDI) of an elongated composite member, the apparatus comprising:

a tool frame assembly comprising first and second guide shafts oriented parallel to a Z axis of the tool frame assembly;

first and second bearing block assemblies slidably coupled to the first and second guide shafts respectively and comprising first and second pivots respectively, the first and second pivots being rotatable about first and second axes of rotation which are parallel to an X axis perpendicular to the Z axis; and an NDI probe assembly comprising a probe frame assembly and first and second NDI probes, wherein the probe frame assembly comprises first and second rotatable shafts which are coaxial with a third axis of rotation perpendicular to the X axis, the first and second rotatable shafts being rotatably and translatably coupled to the first and second pivots respectively for rotation about and translation along the third axis of rotation.

20. The apparatus as recited in claim 19, wherein the probe frame assembly comprises:

a lower frame bracket;

first and second linear slide tables which are translatable relative to the lower frame bracket along first and second linear paths which are mutually parallel; and third and fourth linear slide tables which are respectively translatable relative to the first and second linear slide tables along a third linear path which is perpendicular to the first and second linear paths, and wherein the first NDI probe is coupled to the third linear slide table and the second NDI probe is coupled to the fourth linear slide table.

* * * * *